United States Patent
Sevce et al.

(10) Patent No.: US 11,178,014 B1
(45) Date of Patent: Nov. 16, 2021

(54) ESTABLISHMENT AND CONTROL OF GROUPED AUTONOMOUS DEVICE NETWORKS

(71) Applicant: Amazon Technologies, Inc., Seattle, WA (US)

(72) Inventors: Ondrej Sevce, Dublin (IE); Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 602 days.

(21) Appl. No.: 15/719,467

(22) Filed: Sep. 28, 2017

(51) Int. Cl.
*H04L 29/08* (2006.01)
*H04L 12/26* (2006.01)
*H04L 29/06* (2006.01)
*H04L 12/24* (2006.01)
*H04L 12/715* (2013.01)

(52) U.S. Cl.
CPC ............ *H04L 41/12* (2013.01); *H04L 41/142* (2013.01); *H04L 67/10* (2013.01); *H04L 45/04* (2013.01); *H04L 67/12* (2013.01)

(58) Field of Classification Search
CPC ....... H04L 41/12; H04L 41/142; H04L 67/10; H04L 41/065; H04L 63/104; H04L 45/00; G06F 9/45558; G06F 2009/45595; G06F 2009/45591

See application file for complete search history.

(56) References Cited

U.S. PATENT DOCUMENTS

| | | | | |
|---|---|---|---|---|
| 10,452,301 | B1 * | 10/2019 | Farhan | G06F 3/0608 |
| 2005/0021793 | A1 * | 1/2005 | Kubsch | H04L 61/2069 709/229 |
| 2007/0198678 | A1 * | 8/2007 | Dieberger | H04L 41/0893 709/223 |
| 2008/0005321 | A1 * | 1/2008 | Ma | H04L 41/0893 709/224 |
| 2008/0212526 | A1 * | 9/2008 | Oyman | H04B 7/0691 370/329 |
| 2011/0106934 | A1 * | 5/2011 | Sadasivan | H04L 41/0893 709/223 |
| 2012/0221639 | A1 * | 8/2012 | Mallet | G06Q 50/01 709/204 |
| 2012/0303807 | A1 * | 11/2012 | Akelbein | G06F 11/3051 709/224 |

(Continued)

Primary Examiner — Hitesh Patel
Assistant Examiner — Clifton Houston
(74) Attorney, Agent, or Firm — Klarquist Sparkman, LLP

(57) ABSTRACT

A method includes forming a logical group of network devices from a plurality of network devices based on at least one attribute of the network devices. The method further includes selecting at least one similarity metric for the logical group of network devices. The method also includes determining a value of the similarity metric for each of the network devices of the logical group. The method further includes comparing values of the similarity metric corresponding to each of the network devices of the logical group against a threshold value. The method also includes determining an action to be taken at one or more of the network devices based on the comparison between the values of the similarity metric and the threshold. There may also be multiple interconnected groups, each performing these actions independently and conveying the computed information between each other.

17 Claims, 11 Drawing Sheets

(56) References Cited

U.S. PATENT DOCUMENTS

| | | | | |
|---|---|---|---|---|
| 2013/0265932 A1* | 10/2013 | Huang | .................. | H04W 8/186 |
| | | | | 370/312 |
| 2013/0272186 A1* | 10/2013 | Mohanty | ............... | H04L 1/0026 |
| | | | | 370/312 |
| 2013/0339441 A1* | 12/2013 | Vasquez | ................ | H04W 4/023 |
| | | | | 709/204 |
| 2014/0047095 A1* | 2/2014 | Breternitz | .............. | G06F 9/5072 |
| | | | | 709/224 |
| 2014/0075494 A1* | 3/2014 | Fadida | ................ | G06F 9/45558 |
| | | | | 726/1 |
| 2015/0040129 A1* | 2/2015 | Park | ...................... | G06F 9/5077 |
| | | | | 718/1 |
| 2015/0098388 A1* | 4/2015 | Fang | .................... | H04W 8/005 |
| | | | | 370/328 |
| 2015/0116811 A1* | 4/2015 | Shrivastava | ........... | G08C 23/04 |
| | | | | 359/275 |
| 2015/0288569 A1* | 10/2015 | Agarwal | ............. | H04L 41/0886 |
| | | | | 709/224 |
| 2015/0288590 A1* | 10/2015 | Mason | ................ | H04L 67/1008 |
| | | | | 709/224 |
| 2016/0261622 A1* | 9/2016 | Danielson | ........... | H04L 67/1095 |
| 2016/0277249 A1* | 9/2016 | Singh | .................. | H04L 67/1097 |
| 2017/0063654 A1* | 3/2017 | Acuna | ................ | H04L 67/1097 |
| 2017/0141980 A1* | 5/2017 | Palanciuc | ............... | H04L 43/08 |
| 2018/0331888 A1* | 11/2018 | Yao | ........................ | H04L 69/40 |
| 2019/0286491 A1* | 9/2019 | Bohacek | ............... | G06F 9/5061 |

* cited by examiner

ESTABLISHMENT AND CONTROL OF GROUPED AUTONOMOUS DEVICE NETWORKS

BACKGROUND

Cloud computing is the use of computing resources (hardware and software) which are available in a remote location and accessible over a network, such as the Internet. Users are frequently able to buy or rent these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In some instances, it may be desirable for a service provider to employ a network that behaves autonomously or semi-autonomously to discover other devices in the network, and even repair or circumvent devices within the network in a state of failure (or near-failure) to relieve the necessity of manual maintenance in the configuration or restoration of each network element. This may occur in small-scale networks (such as, small or medium sized businesses), or may occur in much larger infrastructures (such as, large networks, companies, or any other configurations in which direct human involvement may be costly).

DETAILED DESCRIPTION

Figure 1A:
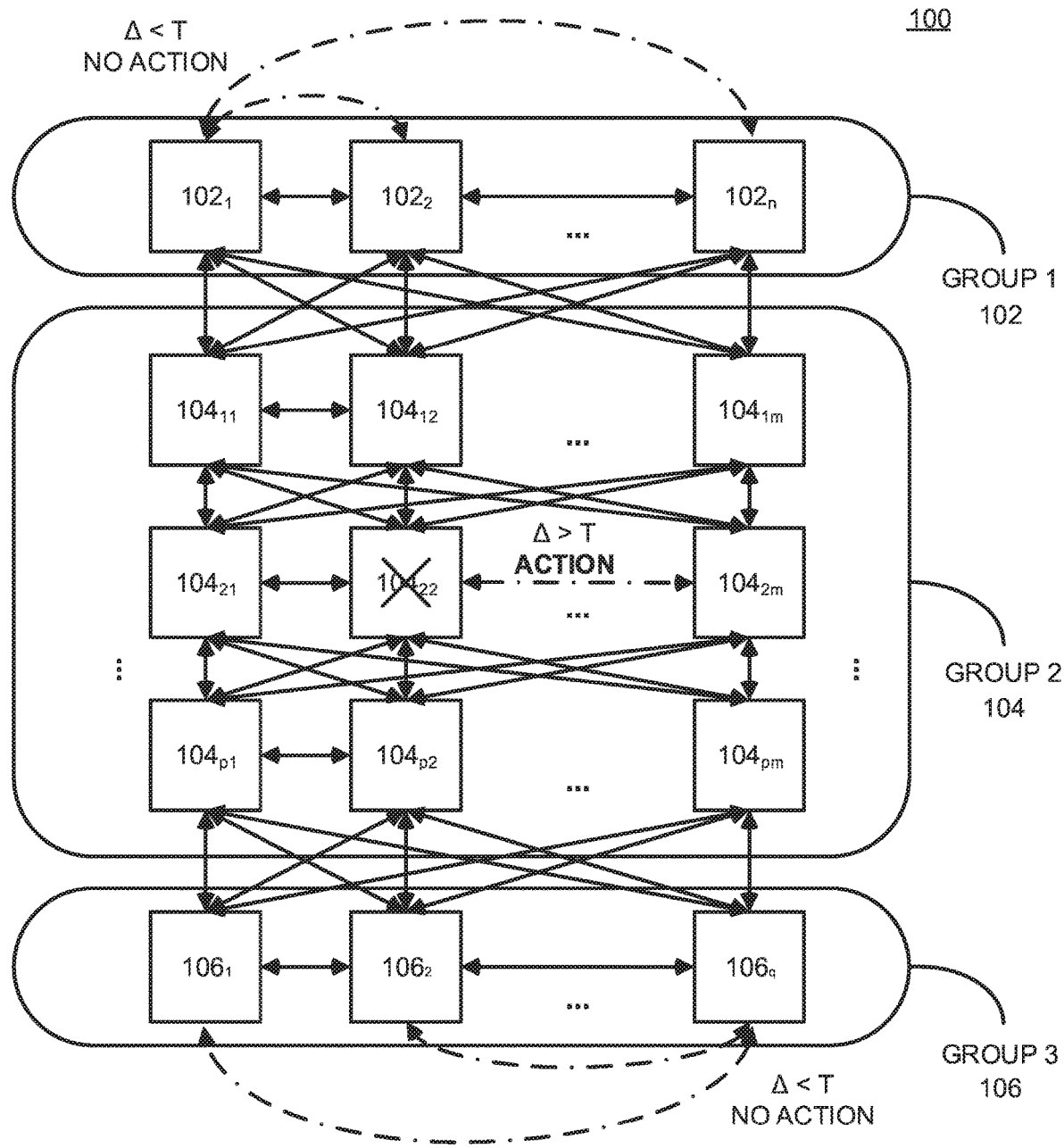
FIGS. 1A, 1B and 1C are drawings of a network system, according to various embodiments of the present disclosure.

In the following description, various embodiments will be illustrated by way of examples and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Administration of a large area network involves organization and the implementation of procedures that contribute to the operational stability and efficient and economical management of the network. In large area networks, network devices, such as routers, switches, hubs and access points, are categorized into custom device logical groups, which simplifies group operations as well as other network management tasks. As used herein, the terms "group", "network group", and "logical group" may be used interchangeably.

Systems and methods in accordance with various embodiments of the present disclosure provide autonomous grouping for a plurality of network devices based on attributes of the network devices such as, but not limited to, network device type, device functionality, device performance, geographic location, manufacturer, and so forth. According to some embodiments, the network devices of a group are assigned one or more similarity metrics (such as how frequently the devices drop packets, the number of dropped packets, device temperature, device bandwidth, etc.). In some embodiments, devices in a group may select at least one similarity metric for the group based on a consensus protocol, wherein each group member is pre-programmed to, or, based on comparison with other group members, vote for a particular similarity metric standard for the group. Each network device in the group can then determine a corresponding individual (personal) value of the similarity metric within the given group. The network devices of the group can then compare their respective similarity metric values with neighbors based on a predetermined criterion. In embodiments, this predetermined criterion is a measure of similarity between two or more of the network devices in a group. In some embodiments, the similarity metric can be assigned to the group based on group some measure of device attribute similarity, or may be imposed by a governing party such as a central server. In an embodiment, the predetermined criterion may include each of the network devices of the group comparing their corresponding value of the similarity metric with the values of each of the other network devices of the group. At least one of the network devices of the group may determine that one or more network devices are behaving abnormally or inefficiently based on a comparison between individual similarity metric values.

In some embodiments, the network devices may compare one or more neighboring similarity metric values to their own similarity metric value, and may notify any number of neighbors in the group as to a discrepancy in the differences between similarity metric values. This may cause neighboring network devices to perform an action, such as voting to circumvent traffic around the device if it is determined that the device similarity metric value (often a measure of performance, storage, responsiveness, or anything else) falls below a specified threshold. In some embodiments, the network device under question may be notified or commanded by one or more neighbors to take a particular action. In some other embodiments, members of the group (possibly including the device in question) may be polled, and/or may vote collaboratively on a course of action. Such polling/voting can be referred to as a consensus protocol between network devices in a group, can extend beyond a specific group to a similar group, or can even include comparison between similarity metric values between entirely separate groups.

Thus, in some instances, groups may be nearly identical with one or more exceptions (such as identical server computers located in different cities), but may still participate in the group voting process despite being in a technically separate group. In other embodiments, groups may be very dissimilar (such as a server group and a virtual machine instance (VMI) group), but may still have a common similarity metric (such as a packet loss or traceroute metric) for which an action can be voted on across the differing groups, or may be taken by an individual device according to a predetermined threshold. For example, any of the network devices may simply evaluate their own performance and take action upon themselves (such as restarting, re-routing network traffic, re-grouping, etc.) after comparing the device's similarity metric value to a pre-stored or electronically accessible threshold value.

Additionally, a governing logical device such as a central server may monitor the network device and decide whether any action should be taken on the network device. The central server could perform continuous or periodic monitoring of the network device, or could wait for one or more of the network devices to report the status of their similarity metric value(s) within one or more of the groups and subsequently make a decision to perform an action. Further, device members of the group may determine an action to be performed at the network device based on the consensus protocol of one or more group device members, or device members spread throughout a plurality of groups. Alternatively, the device in question can autonomously decide to take an action without further external input.

Any action taken, either autonomously or via a consensus, can be reported to other groups and inter-group devices so that the individual network devices can adjust existing parameters to update potential future interactions with the device. For example, if network traffic is to be routed around a given device, members of a different group may adjust their message headers to avoid a particular network device. Alternatively, the edge device members of a group in direct contact with one or more groups may perform this re-routing themselves without notifying other groups to save computing resources.

Various embodiments of the present inventions are presented by way of examples illustrated in the FIGS. 1A-9.

Figure 1B:
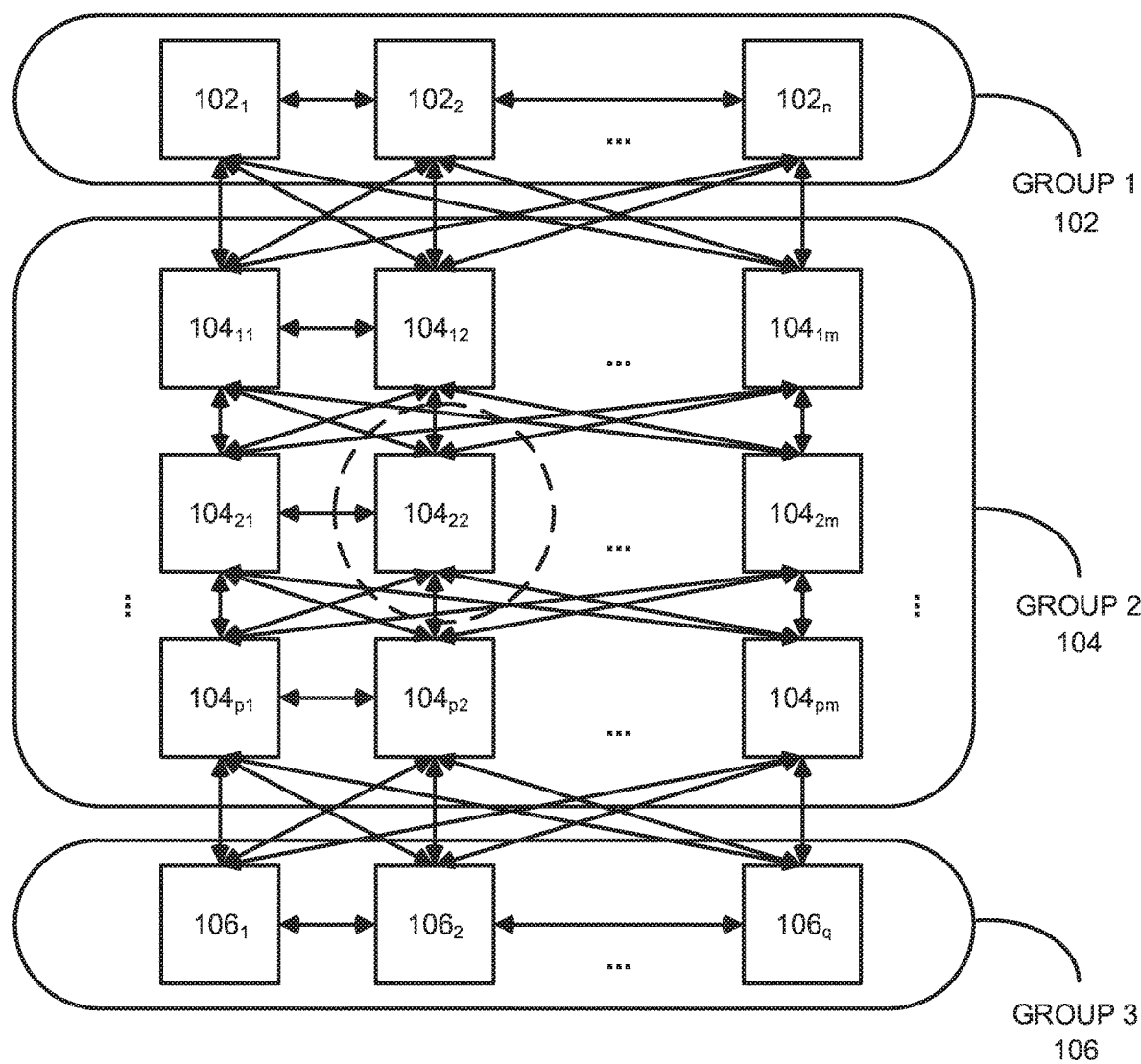
Figure 1C:
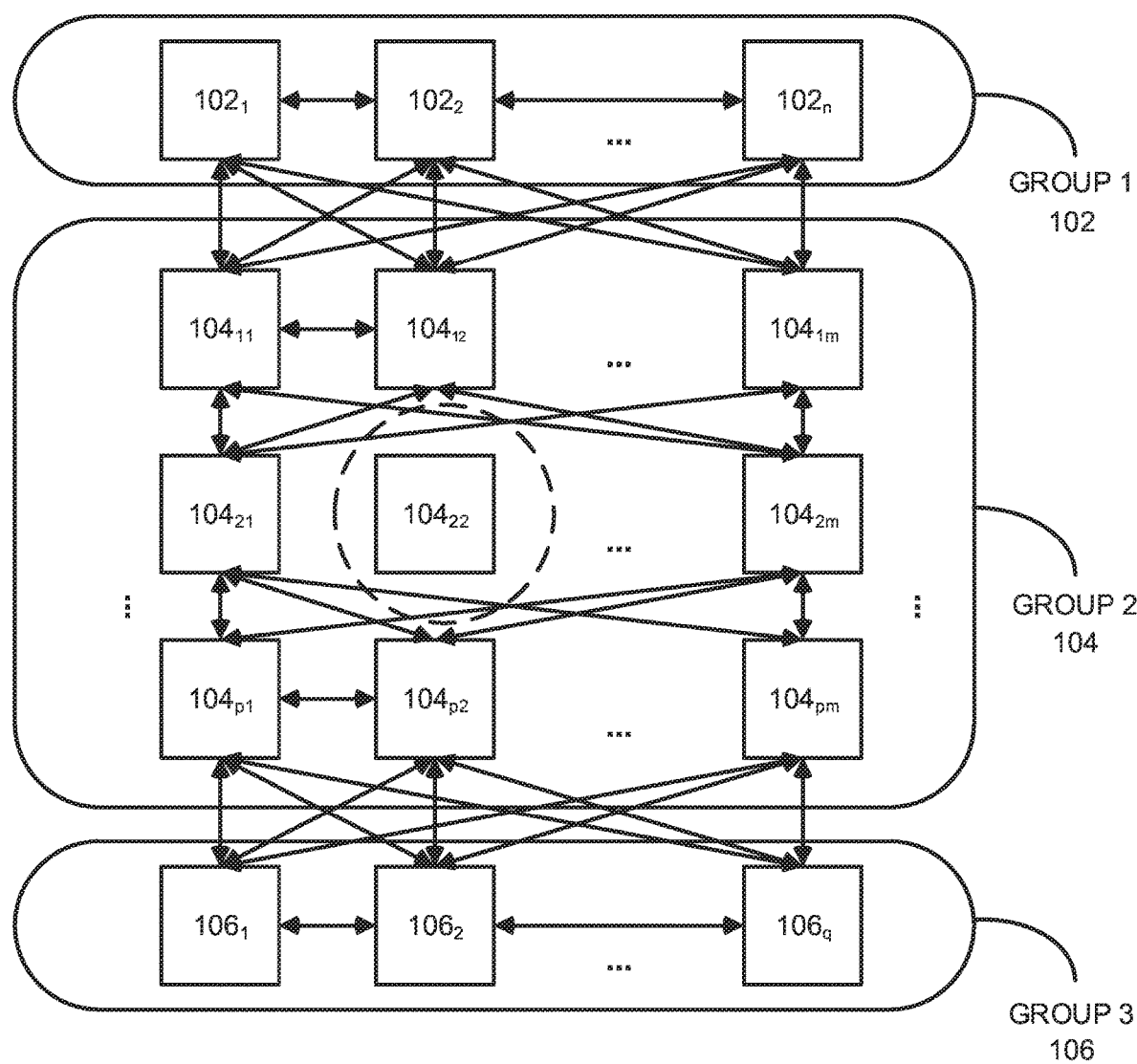

FIGS. 1A, 1B and 1C illustrate a network system 100, in accordance with various embodiments of the present disclosure. The network system 100 may be used by a service provider for providing services such as, but not limited to, networking, telecommunication, data center, virtualization, video conferencing, and other functions/services. Alternatively, the network system 100 may be used by an enterprise or other entity. The network system 100 may include a plurality of network devices $102_1$-$106_q$ communicably coupled to each other. The network devices $102_1$-$106_q$ may include, but not limited to, virtual machine instances (VMI's), digital sub-systems, server computers, modems, routers, switches, hubs, satellite link components, fiber modems, and so forth.

In an embodiment, at least one of the network devices $102_1$-$106_q$ may include a processor and a network interface. The processor may execute instructions for performing various functions of the network device. Further, the network interface may include a network interface card or other hardware configured to interface with other network devices of the network system 100.

In another embodiment, the network system 100 uses the network devices $102_1$-$106_q$ to relay information to recipients, such as, but not limited to, customer (or client) computers, Universal Serial Bus (USB) drives, cellular phones, Digital Versatile Disc (DVD) drives, televisions or other displays, tablets, wearable devices, Global Positioning System (GPS) units, Virtual Machines (VM) or Virtual Machine Instances (VMI's). In some embodiments, a customer may own or rent one or more instances from one or more VMs and VMIs running in a computer service provider system, for the purposes of storage, computation, or for any other suitable application. The VMI's may reside on a singular server or may be distributed amongst multiple servers in a compute service environment. In some other embodiments, the VMI's may reside on one or more servers located at multiple geographic locations. In alternative embodiments, the recipient such as, a client or customer computer transmits information such as, but not limited to, a phone call, message, image, video, and so forth, to the network system 100 for communication, storage, or any other applications.

The network devices $102_1$-$106_q$ may be interconnected with each other using wired and/or wireless communication links. The network devices $102_1$-$106_q$ may transmit or receive data using the communication links. In some embodiments, the network devices $102_1$-$106_q$ may be communicably coupled to each other via a two-way communication protocol. Further, the network devices $102_1$-$106_q$ may directly or indirectly (for example, through an intermediate network device) interconnected with each other. In some embodiments, the network devices $102_1$-$106_q$ may utilize a network to interconnect with each other. The network may include a data network such as, but not restricted to, the Internet, a Local Area Network (LAN), a Wide Area Network (WAN), a Metropolitan Area Network (MAN), etc. In certain embodiments, the network may include a wireless network, such as, but not restricted to, a cellular network and may employ various technologies including Enhanced Data rates for Global Evolution (EDGE), General Packet Radio Service (GPRS), Global System for Mobile communications (GSM), Internet protocol Multimedia Subsystem (IMS), Universal Mobile Telecommunications System (UMTS) etc. The network may further include a circuit-switched voice network, a packet-switched data network, or any other network capable for carrying electronic communications. In some embodiments, the network may utilize various protocols such as, but not limited to, the Internet protocol (IP), Asynchronous Transfer Mode (ATM), or File Transfer Protocol (FTP) for the communication between the network devices $102_1$-$106_q$.

In an embodiment, the network devices $102_1$-$106_q$ may form an autonomous network that is self-contained without any dependency on an external monitoring system. In a further embodiment, the network devices $102_1$-$106_q$ may autonomously arrange themselves into multiple groups in order to identify and monitor various conditions, such as malfunctioning or inefficient network devices, congested interfaces, and unreachable ports in each of the groups. Further, the network devices $102_1$-$106_q$ in the respective groups may dynamically adapt to such conditions in order to maintain reliable operation of the network system 100. Therefore, the network devices $102_1$-$106_q$ may form a self-healing network that is capable of monitoring various parameters and performing various corrective actions without any external intervention.

In some embodiments, a subset of the plurality of network devices $102_1$-$106_q$ forms a network group or a network family. As illustrated in FIG. 1A, the network devices $102_1$-$102_n$ form a network group (group 1) 102, the network devices $104_1$-$104_{pm}$ form a second network group (group 2) 104, and the network devices $106_1$-$106_q$ form a third network group (group 3) 106. In an embodiment, the network groups 102, 104 and 106 may be defined as logical combinations of the network devices 102$_1$-106$_q$ based on a shared attribute and communicably coupled with each other. In some embodiments, network devices may be connected in series ("daisy-chained") to minimize traffic to any one network device. In these embodiments, information could be "propagated" from device 102$_1$ through device 102$_2$ to eventually reach device 102$_n$. Alternatively, each group member could be in direct communication with every other group device, such that information is directly communicated from 102$_1$ to 102$_n$ (e.g., a CLOS network configuration).

Occasionally, as demonstrated in FIG. 1A, only certain elements of a group (such as 104$_1$-104$_{1m}$) may communicate with a neighboring group 102. As stated, the network devices 102$_1$-102$_n$, 104$_1$-104$_{pm}$ and 106$_1$-106$_q$ form the respective network groups, i.e., the network groups 102, 104 and 106, based on at least one attribute of the network devices 102$_1$-106$_q$. In some embodiments, the attribute may reflect a similarity among the network devices of a group, such as being a router or a VMI. In some embodiments, the attribute includes at least one of a device type, a device function, or a geographic location. The type of device may include manufacturer details, functionality, and hardware and/or software (for example, software version) configuration of the device. In an embodiment, each of the network devices 102$_1$-106$_q$ may have identification settings that label them based on device type. For example, the identification settings may distinguish a router switch from a client computer. Therefore, the network devices 102$_1$-106$_q$ may be arranged in one or more groups based on the corresponding identification settings.

In an example, a network group may include only a plurality of routers, or only a plurality of switches. In another example, network devices belonging to a particular manufacturer's product line may be included in a network group. Further, the device function may include the role of the device in a network such as front-end, back-end, internet facing, backbone, intranet, and so forth. In an embodiment, a network group may include only front-end devices, such as firewalls.

The geographic location of the network device may correspond to GPS coordinates, IP address of the network device or the routing coordinates of the network device. Therefore, a group based on geographic location may include all the network devices located within a geographic area (for example, a country), an IP address range, or a subnet range. In another embodiment, all the network devices within a same peer-to-peer or P2P protocol may be grouped together.

In some embodiments, the network devices 102$_1$-106$_q$ may form a network group based on the application and requirements of the network system 100. For example, if a client uses geographically dispersed computer servers to build a massive parallel architecture, it may be beneficial to form network groups based on similar functionality to improve efficiency for various tasks. In some other embodiments, if the client seeks to store a large amount of data, it may be beneficial to form network groups of network devices which are proximally close with little functional similarity. Additionally, the network groups may be scaled into sub-groups to further expedite processing efficiency. The ways in which groups are formed may increase the value of a customer's experience, and in some embodiments may remain transparent to the customer. In other embodiments, the customer may have total or partial control of the grouping mechanisms.

In another embodiment, the similarity between network devices in a group may be based on a traffic source or destination, and security measures used in transmission. For example, all the devices in a group may receive traffic from a location A and transmit the traffic to a location B. In another example, the devices in a group may transmit traffic towards location C. The locations A, B and C may include a geographical location, an IP address range, and/or a subnet range. A group may also include devices transmitting data through a common firewall.

In some other embodiments, the similarity between network devices in a group may be based on device name, one or more performance metrics (e.g., CPU capacity, network capacity, etc.), a similar manufacturer, similarities in Internet Protocol/Media Access Control (IP/MAC) addresses, proximity or communication over a same or a co-located modem, a predetermined metric of similarity (for example, a same corporation spread across the country), etc.

In another embodiment, the attribute for determining similarity between the network devices 102$_1$-106$_q$ may be a vector based on a traffic pattern similarity, physical metrics similarity, configuration similarity, or a combination thereof. The traffic pattern similarity may include type of data transmitted/received, communication protocol used, amount of packet transmitted/received, and the like. The physical metrics similarity includes device temperature, fan speed, transmission efficiency, number of Power Supply Units (PSUs) connected, and so forth. The configuration pattern similarity may include, network connectivity, network architecture of a network device, and so forth.

For example, each network device can calculate its own similarity metric value $\Delta_{xy}$ based on a similarity metric (such as temperature, or packet loss, or anything else that can be measured by the network device). In the case of temperature, the individual similarity metric value of a particular device (say, device 102$_1$) may calculate a similarity metric value of $\Delta_1=82°$ F. A second device (say, device 102$_2$) may use the same similarity metric to calculate a different similarity metric value (say $\Delta_2$) with a value $\Delta_2=95°$ F. As shown at the bottom of FIG. 1A, Ai can be compared against $\Delta_2$ by 102$_1$, 102$_2$, or by a third party device such as 102$_n$, or may even be "voted" on by two or more members of the group to determine if devices 102$_1$ or 102$_2$ falls beyond a similarity metric value threshold "T" with respect to one another. As previously stated, members of other groups such as group 2, 104 may also vote if they share the same similarity metric. In this example, $\Delta_{xy}=\Delta_1$ and $\Delta_{rs}=\Delta_2$ on the scale at the bottom of FIG. 1A. A simple calculation, such as division, could be used to determine if one of the devices is dissimilar enough from the other to warrant an action being taken, such as turning on a fan to cool the device in question off. In some embodiments, the devices may independently or collectively determine a threshold value T dynamically as circumstances vary.

In this scenario, it may be determined by any or all of the devices in group 2 (including 102$_2$) that $$\frac{\Delta_1}{\Delta_2} = 0.86.$$

As can be seen from FIG. 1A, this value would fall just slightly above the threshold T, which is arbitrarily set around 0.85. Based on the differences in the calculated similarity metric value, a decision can be made to turn on a fan in device $102_2$, to restart device $102_2$, or take any other prescribed action. As stated, this decision can be made individually by any of the autonomous devices, but could also be made collectively over a consensus protocol "vote" in which two or more devices register a collective poll as to whether or not an action is to be taken for a given network device. The threshold indicates a number or percentage used in comparison against the differences in the calculated similarity metric values. Consensus protocol "votes" could be taken/calculated by any subset of network devices, and may be directed towards arbitrary categories of performance or configuration. In some embodiments, differences in similarity metric values can be established using Gaussian distributions, standard deviation, averaging, etc. and could be calculated for single network devices or over subsets of multiple network devices. In some instances, the device at issue (say $102_2$) could perform an action on itself without external input from other devices in its group. Likewise, a device may individually command another device to take a particular action without input from other devices in the network. As previously stated, numerous network devices could also "vote" or be polled in light of a device similarity metric value that has strayed beyond a given threshold. Additionally, threshold values could be fixed, or could vary with time, location, etc. Likewise, the similarity metric for a group could change over time, location, etc. As previously mentioned, actions to be taken are also not particularly limited, and could include re-routing traffic around a device, re-starting a device, or even re-grouping a device, possibly into an underperforming or over-performing sub-group of the main group, as further discussed below. A device could also be re-grouped into a new group that did not previously exist, which may or may not be a sub-group.

Usually the comparison between similarity metric values A is only performed within a particular group, such as group 1, 102 group 2, 104, and group 3, 106. In FIG. 1A, the value of Δ is particular to each individual device, though it needn't be unique (e.g., two or more devices could have the same Δ value). However, in some instances, similarity metrics and similarity metric values can be shared between groups. For example, in an embodiment, two or more groups may be similar but geographically separated. In this case, although the groups are separate, they may be treated as one group, or as sub-groups of a larger main group.

The Δ subscripts in FIG. 1A represent the individuality of similarity metric values to a particular network device, as large networks may have hundreds, thousands, or more network devices operating over many differing groups and can have multiple similarity metrics, similarity metric values, or can be networked in matrix format (such as group 2, 104) in which case 2 (or more) subscripts may be more convenient than 1. As will be understood to one of skill in the art, there is no limit to the number of networked "dimensions" that can be addressed, such as $\Delta_{abcde}$ referring to numerous degrees of network device similarity, depending on the system architecture.

In FIG. 1A, group members are depicted as exchanging personal (individual) Δ values, as indicated by the dashed lines, to determine a degree of similarity based on a predetermined metric of similarity. These exchanges could be transmitted by message metadata, TCP/IP, UPD, WiFi, or any other networking communication means or protocol. For example, $\{102_1 \ldots 102_n\}$, $\{104_{22}, 104_{2m}\}$, and $\{106_1 \ldots 106_q\}$ are depicted as exchanging Δ values with each other. In particular, $\{102_1 \ldots 102_n\}$ and $\{106_1 \ldots 106_q\}$ are depicted as not taking any particular action based on the exchange, whereas the group members $\{104_{22}, 104_{2m}\}$ are illustrated as taking an action. This action can be independently made by group member $104_{22}$ (such as rejecting network traffic), or may include re-routing packets around $104_{22}$ by other group members, restarting $104_{22}$, or any other suitable action in response to the maintenance of $104_{22}$. Actions may be self-adopted by $104_{22}$, commanded by one or more members of group 2 104, voted on by one or more members of group 2 104 (including or not including $104_{22}$), or may even be made by one or more network devices outside of or in conjunction with group 2 104 in an attempt to remedy the differential in similarity. This is further illustrated in FIGS. 1B and 1C. This action would usually be taken in response to a comparison between the values of $\Delta_{22}$ and $\Delta_{2m}$, although the action could also be taken as a result of a statistical poll or calculation.

In an embodiment, one or more groups of the network devices $102_1$-$106_q$ may be formed by a divide-and-conquer algorithm. The divide-and-conquer algorithm may be utilized for forming sub-divisions between the network devices $102_1$-$106_q$, and selecting the corresponding rules and protocols for the respective groups. In a further embodiment, the divide-and-conquer algorithm may be implemented by each of the network devices $102_1$-$106_q$. Further, a poll or a similar collaboration mechanism may be performed between network devices of a group (e.g., the group 102) to include a newly discovered network device. Subsequently, one or more network devices of the group 102 may communicate to network devices of other groups (e.g., the groups 104 and 106) that the newly discovered network device belongs to the group 102. By performing various scales of divide-and-conquer, groups, sub-groups, and super-groups may be autonomously formed, modified, or destroyed based on system constraints, architecture, or necessity.

In some embodiments, the network devices $102_1$-$106_q$ may form a group based on one of the aforementioned attributes. In some other embodiments, the network devices $102_1$-$106_q$ may form a group based on a combination of the aforementioned attributes. In an embodiment, the network devices $102_1$-$106_q$ may autonomously identify each other within the network system 100 and form one or more groups. Further, the network devices $102_1$-$106_q$ may enforce different protocols, such as differing consensus protocols, within respective network groups based on their similar attributes. As an example, a wholly non-responsive network device may only require a single, second device to report that it is not responding and should be re-started (or re-routed, re-grouped, etc.), whereas an underperforming network device may require a "vote" or poll to determine if it is underperforming substantially with respect to its fellow network devices based on some threshold. In other embodiments, device attributes may change over time, leading to different similarity metrics(s) for one or more groups, re-arrangement of groups or sub-groups, or overall network topology. Some examples of this could be updated software or firmware, changing geography (e.g., moving network devices), and so forth.

In other embodiments, a central server 208 (see FIG. 2) may control the formation of the one or more groups that are subsets of the network devices $202_1$-$206_q$. The central server may implement different protocols for different network groups, and may control the groups, relay information between the groups, or perform any other service required to maintain the network's health. In this instance, an administrator could provide one or more script files to the central server 208 reflecting different requirements for the groups which could then be passed on to each group. In this case, new or changing requirements could then be distributed or propagated to neighbors within the group.

In some embodiments, each of the network devices $102_1$-$106_q$ may autonomously discover and connect with each other without any external input. For example, each of the network devices $102_1$-$106_q$ may discover each other based on a discovery algorithm. The network devices $102_1$-$106_q$ may connect with or discover each other based on one or more attributes such as, but not limited to, geographical location, device property, device type, performance metrics, manufacturer, software version, Operating System (OS) and so forth. In some embodiments, the network devices corresponding to a network group may share a same geographical space, for example, NW Boston Facility. Further, each of the network devices $102_1$-$106_q$ may collaboratively decide to form a network group based on various observations of mutual similarity. Additionally, the network devices may divide themselves into sub-groups of a parent group based on more refined characteristics. For example, a plurality of network devices may form a parent network group based on geography (for example, a building in downtown Portland), and then form one or more sub-groups within the parent network group based on devices type such as a sub-group including only switches and excluding other main-group members such as client machines. In some other embodiments, network sub-groups may be formed within the same geographic location based on a similar IP address, or any other electronic information such as, subnet masks, device name, GPS etc. In alternative embodiments, the network sub-group may further be classified into additional sub-groups of further parent network groups based on any other similarity. For example, a parent network group of fifteen network devices in one location may be grouped in three sub-groups including routers, switches and client computers, respectively. Further, sub-groups could be formed based on a performance attribute falling above or below a certain threshold. Thus, the network device can still be identified as having an attribute in common with other group members, but may be outperforming or underperforming relative to its fellow group members, necessitating a sub-group that can be taken into consideration when routing network traffic, etc.

Figure 8:
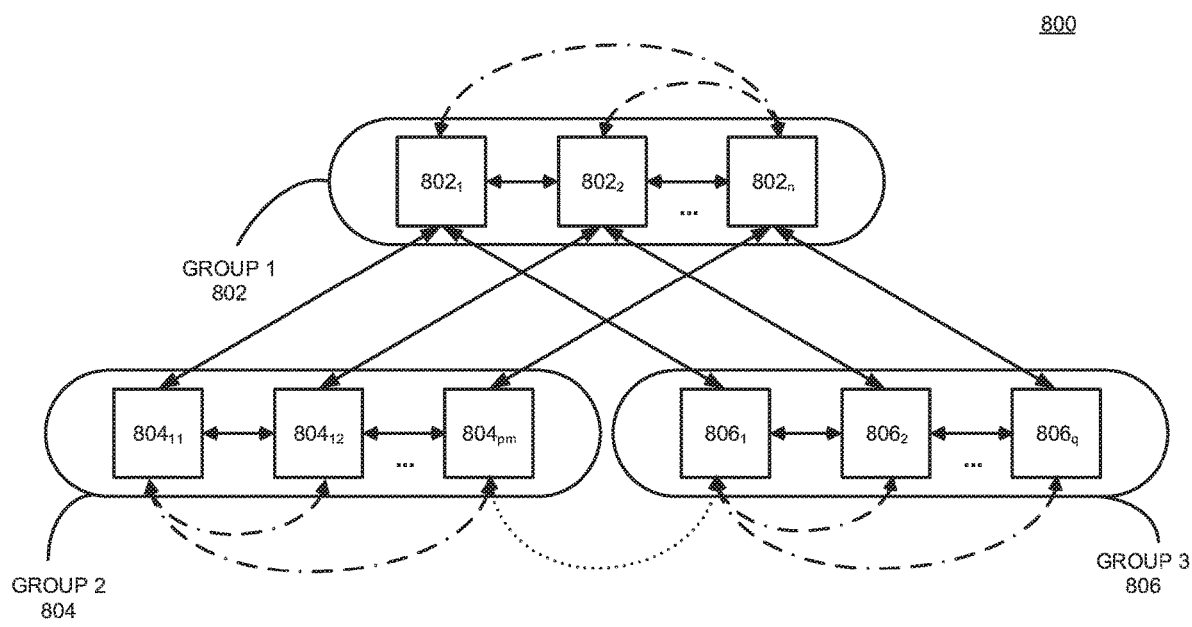
FIG. 8 illustrates an example of a parallel configuration of autonomous or semi-autonomous devices.

In an embodiment, each of the network devices $102_1$-$106_q$ is configured to discover each other independently and determine whether a newly discovered network device belongs to the same network group, another network group or a network group yet to be created. The network system 100 may determine a network group corresponding to the newly discovered network device based on acknowledgments received from each of the network devices indicative of whether the newly discovered network device is part of their respective network group or not. In some embodiments, the decision related to forming a new group or modifying an existing network group may depend on a collaborative poll between the network devices of a given network group, or may arise from a collaboration between each of the network groups 102, 104, 106. Further, a network device may report to each of the network devices about the newly discovered device and its respective network group. For example, if the network device $102_1$ identifies that a newly discovered network device belongs to the network group 104, the network device $102_1$ may inform each of the network devices $102_2$-$106_q$ about the network group of the newly discovered network device, or may simply relay the information to one or more devices in network group 104. In this instance, $102_1$ may propagate this message to its neighbor $102_2$, and so forth until the information reaches device $102_n$. Alternatively, $102_1$ may individually relay the information personally to each of $102_2$-$102_n$, depending on the network configuration. Meanwhile, the recipient from group 104 (such as $104_{11}$) may perform these same tasks to propagate the information to each device in group 104. Similarly, one or more devices from group 104 may propagate this information to group 106, which can also follow any of the above-mentioned processes. In some parallel configurations, the group 102 may communicate this information directly to group 106 without the need to propagate information through group 104 if the information is not critical to group 104. In this instance, group 102 may communicate information directly to either or both of groups 104 and 106 independently, if required. Such embodiments could involve communicating information through an intermediary such as central server 208, or directly between groups in a parallel network configuration (such as illustrated in FIG. 8).

In an embodiment, a number of network devices in a group may lie within a range. The range may be predetermined for the network system 100. Alternatively, the range may be dynamically calculated. The range may be based on various parameters, such as a bandwidth of the network system 100, type of network devices, and so forth. A group of network devices may be a one-dimensional array (e.g., groups 102 and 106) or a multi-dimensional array of network devices (e.g., the group 104).

Each of the network groups 102, 104, and 106 may implement a separate communication protocol for the communication between the network devices $102_1$-$102_n$, $104_1$-$104_{pm}$ and $106_1$-$106_q$ respectively, although this need not always be the case. In some embodiments, each of the network groups 102, 104 and 106 may implement a consensus or logical protocol among the network devices $102_1$-$102_n$, $104_1$-$104_{pm}$ and $106_1$-$106_q$, by which a network device may exchange information with other network devices within a network group (or across network groups) in order to reach a consensus. Each of the network devices $102_1$-$106_q$ may communicate with other network devices in the respective network groups to select at least one similarity metric.

Specifically, network devices in a group, irrespective of their types, may communicate with each other to select the similarity metric. In some embodiments, the similarity metric may be selected based on the consensus protocol. The consensus protocol enables each of the network devices $102_1$-$106_q$ to propose one or more similarity metrics to evaluate their performances within the respective network groups. The proposed similarity metrics may be communicated to the other network devices $102_1$-$106_q$ within the respective network groups. Further, the network devices $102_1$-$106_q$ within each group may autonomously reach a consensus to select at least one similarity metric common to the corresponding group. In an embodiment, each of the groups 102, 104 and 106 may follow different consensus protocols. In another embodiment, the network devices $102_1$-$106_q$ of the network system 100 follow a common consensus protocol. In some embodiments, the consensus protocol may include selecting the similarity metric(s) with the maximum number of proposals within the group. In other embodiments, the consensus protocol may include selecting the similarity metric(s) that are proposed by a specific type of network device, for example, a computer server. In some other embodiments, the similarity metric is selected from at least one of a hardware metric and a performance metric. The hardware metric may include hardware parameters such as, but not limited to, fan speed, temperature, and so forth. The performance metric may be based on performance indices such as, but not limited to, packet dropped, time duration for packet transmission, bandwidth required, traffic in/out level and so forth.

In some embodiments, the similarity metric may be predetermined for certain groups or classes of groups. In these embodiments, the similarity metric could be dictated by a client or administrator, pre-programmed into the devices, or dictated by a central server or other network entity.

In alternative embodiments, the similarity metric can be selected based on the type of communication, for example, two network devices that routinely communicate with one or more similar IP addresses are likely to have similar values of the similarity metric. In some other embodiments, the similarity metric is selected based on geographic locations of the network devices, i.e., a switch on a host network may have a closer similarity metric to a client computer based on geographical proximity. In some embodiments, each of the network devices $102_1$-$106_q$ may also disclose the amount of data traffic, number of users, or any other information to other network devices for the selection of the similarity metric(s).

In some embodiments, each of the network groups 102, 104 and 106 may have a common similarity metric. In some other embodiments, each of the network groups 102, 104 and 106 may have different similarity metrics.

Each of the network devices $102_1$-$106_q$ may determine its own similarity metric value $\Delta$ corresponding to the similarity metric. In an embodiment, each of the network devices $102_1$-$106_q$ may autonomously determine various values of the similarity metric such as, but not limited to, temperature, efficiency, workload, connection status, and so forth. In some embodiments, the value $\Delta$ of the similarity metric associated with each of the network devices $102_1$-$106_q$ may be indicative of the performance of the respective network device. While a given device may usually calculate its own similarity metric value $\Delta$, it is also possible for other members of the group to calculate this value for a group member based on observation of the given network device.

The network devices $102_1$-$106_q$ may also periodically determine the value $\Delta$ of the corresponding similarity metric. Alternatively, the network devices $102_1$-$106_q$ may determine the value $\Delta$ based on a request or a query. In some embodiments, each of the network devices in a group may transmit a request to other devices of the group for the corresponding values of the similarity metric. In some other embodiments, the central server may transmit a request to a network device to determine the value $\Delta$ of its similarity metric. In some embodiments, the central server may determine a value $\Delta$ of a similarity metric corresponding to a network device. In an alternate embodiment, a client system may request a network device of a network group to determine the value $\Delta$ of its similarity metric.

In an embodiment, the similarity metric for a group of network devices may be a vector based on traffic pattern metrics, physical metrics, or a combination thereof. The traffic pattern metric may include type of data transmitted/received, communication protocol used, amount of packet transmitted/received, and the like. The physical metrics may include device temperature, fan speed, transmission efficiency, number of PSUs connected, and so forth. The values of the similarity metric corresponding to the network devices may be determined to generate the similarity metric vector for the group.

Further, the values of the similarity metric vector may indicate a degree of similarity between two or more network groups. Each of the network devices $102_1$-$106_q$ may retrieve the values of the similarity metric vectors of the other network groups to determine the degree of similarity between the network groups. For separate groups with similar similarity vectors, it may be appropriate to control, query, monitor, or conduct polls for devices in a separate but similar group.

In embodiments where each of the network devices $102_1$-$106_q$ compare the values of the similarity metric corresponding to the network devices of the respective groups, a similarity table may be computed based on the comparison between the various values computed from the similarity metric. The value $\Delta$ of the similarity metric may correspond to a score of the network device in the similarity table. In some embodiments, the similarity table is defined as a hierarchical list of the network devices of the network group arranged according to the values of the corresponding similarity metrics. The hierarchical list for a group may include the network devices in the group arranged in an ascending order or a descending order based on the values of the corresponding similarity metric values. The hierarchical list may be dynamically updated based on the current values computed for the corresponding similarity metric. Further, each of the network devices $102_1$-$106_q$ may store the hierarchical list for each of the respective groups. In some embodiments, each of the network devices $102_1$-$106_q$ may include a memory and/or a register (not shown) for storing the corresponding hierarchical list. In some embodiments, the predetermined criterion may be based on a position of a network device in the hierarchical list of the corresponding group.

In an embodiment, a specific network device in a group may compute and update the hierarchical list, and transmit the hierarchical list to the rest of the network devices in the group. Alternatively, each of the network devices in a group may independently compute and update the hierarchical list. In another embodiment, the central server may compute and update the hierarchical list. In an embodiment, each of the network devices $102_1$-$106_q$ may store the current value $\Delta$ of the corresponding similarity metric. Each of the network devices $102_1$-$106_q$ may also maintain a historical record of the values of the similarity metric. Further, each of the network devices $102_1$-$106_q$ may also store a current hierarchical list for the respective groups. In an alternative embodiment, the hierarchical list may be stored on the central server. Further, the central server may store the values of the similarity metric corresponding to each of the network devices $102_1$-$106_q$.

In an embodiment, the predetermined criterion may include comparing the value $\Delta$ of the similarity metric of each network device in a group with a similarity number. The similarity number may be indicative of a degree of similarity between the network devices of the group. The similarity number may include a mean of the values of the similarity metric, a standard deviation of the values of the similarity metric, or any other mathematical or statistical comparison between two or more network devices.

In some embodiments, the predetermined criterion may include comparing the value $\Delta$ of the similarity metric of each network device in a group with a dynamic value. The dynamic value may be based on a standard deviation of the values of the similarity metric of a network group. For example, the dynamic value may be an integer multiple of the standard deviation (a), for example, 36. In some other embodiments, the dynamic value may be a mean of the values of the similarity metric of a network group. In alternative embodiments, the predetermined criterion may include comparing the value $\Delta$ of the similarity metric, corresponding to each of the network devices in a network group, with a threshold value. The threshold value may be determined by the network devices of the network group based on the corresponding consensus protocol. In some other embodiments, the threshold value may be predetermined during setup of the network system 100. In yet other embodiments, the threshold value may be determined by the central server. The threshold value may be stored in the memory of each of the network devices $102_1$-$106_q$. In another embodiment, the threshold value may be dynamically evaluated based on a current performance of the network devices.

In other embodiments, the predetermined criterion may include determining whether the value Δ of the similarity metric of each network device in a group lies within a range. The range may include an upper limit and a lower limit of the similarity metric. The range may be a predetermined value or may be dynamically calculated based on current values of the similarity metric.

In some other embodiments, each of the network device $102_1$-$106_q$ may compare the value Δ of similarity metric with the values of the similarity metric of the other network devices within the respective network groups to determine an out-of-norm network device. The out-of-norm network device is considered as dissimilar from the other network devices in the group based on the values of the similarity metric. In some embodiments, the least similar network device in the group may be determined based on the consensus protocol. The out-of-norm network device may be inefficient or malfunctioning, and requires an action to be performed thereon based on the consensus protocol of the group. In an embodiment, the network device with the least value Δ of the similarity metric in the hierarchical list of the group may be considered as the out-of-norm network device. In some other embodiments, the network devices having the values of the similarity metric less than a threshold value of the group may be considered as the out-of-the norm network devices. In yet other embodiments, the network devices whose values of the similarity metric deviate beyond a certain degree from the mean value of the group may be considered as the out-of-norm network devices. For example, network devices whose values of the similarity metric lie beyond 36 may be considered as the out-of-norm network devices. In an embodiment, a combination of two or more predetermined criteria may be used for identifying out-of-norm devices. For example, the network device having the least value Δ of the similarity metric in the hierarchical list of the group may be identified. Further, the value Δ of the similarity metric of the identified network device may be further compared to the threshold value to confirm whether the identified network device is malfunctioning or inefficient.

In an embodiment, network devices of a group may normalize the values of the similarity metric based on device type. For example, an edge router switch may have a value $Δ_a$ of the similarity metric that is close to a value $Δ_b$ of a core router switch. However, the edge router switch may have a value of the similarity metric $Δ_a$ that is different from a value of a client computer $Δ_c$. Therefore, a normalization coefficient may be incorporated in the value of the similarity metric of the client computer $Δ_c$ so that an appropriate comparison may be made with the value of the edge router switch.

In an embodiment, each of the network devices $102_1$-$106_q$ may autonomously determine any performance degradation or malfunction based on the measure of dissimilarity of the value Δ of the similarity metric from other network devices of the respective groups. Specifically, each of the network devices $102_1$-$106_q$ may determine any degradation in the performance of the respective network devices based on the comparison between the values of the corresponding similarity metrics. In a further embodiment, at least one of the network devices of a network group determines an action at one or more network devices of the group based on the comparison between the values of the similarity metric. For example, the comparison between the values of the similarity metric corresponding to network devices of a network group may indicate an out-of-norm network device within the network group. The other network devices of the group may reach a consensus regarding an action to be taken at the out-of-norm network device in order to mitigate the problem and maintain an efficient performance of the network group. In some embodiments, the out-of-norm network device may autonomously identify any malfunction or degradation in its performance based on the comparison and take suitable action. For example, the device may restart itself or reconfigure itself to maintain the performance efficiency and stability of the corresponding network group. In some other embodiments, the action to be taken at the one or more network devices is based on the consensus protocol. The action may include, but not limited to, device shutdown, rerouting traffic from the network device, control the network device to reject traffic, re-grouping the device, and so forth. In some other embodiments, the action may include flagging the network device in order to notify the other network devices of the group, and/or even a system administrator about the problem. The action may also include waiting for a predetermined time duration and then repeating the consensus decision based on current values of the similarity metric. For example, the network devices may act if the value Δ of the similarity metric of a particular network device is outside the norm for a predetermined time period. The action to be taken may also be based on the value Δ of the similarity metric. For example, if a temperature metric of a network group indicates a high temperature of a network device, the network device may be switched off or a fan speed may be increased. Similarly, for an abnormal discard of traffic, the corresponding network device may be restarted, or forced to stop accepting traffic.

In other embodiments, each of the network devices $102_1$-$106_q$ may compare the value Δ of the corresponding similarity metric against an internal threshold to determine if the device is malfunctioning or unstable. For example, if each member of a group is suffering from the same type of degradation (say, overheating), but each group member determines that they are still similar to each other, it is possible that no action would be taken by any group member. This circumstance could lead to a "downward spiral" effect that could threaten the whole group (and possibly even the whole network). Under this circumstance, individual elements could continually check the similarity metric against an internal threshold value, and take action if they determine that they have fallen below this threshold.

This could occur in a number of different ways. For example, as discussed above, in one scenario, individual devices could simply police themselves, and take actions based on their individual thresholds. In other scenarios, only one or more devices may perform this check for the group. In this second scenario, the one or more devices may perform an action, such as restarting (for example), and then report their updated status to the remaining devices. The remaining devices could then detect that they are very dissimilar to the one or more checking devices, and can take corrective action if they are very dissimilar. In some instances, the similarity metric could be more complex, and include a "polarity" to indicate not only whether a device is similar to a second device, but also whether the dissimilarity between the first device and second device is positive (first device has better performance) or negative (second device has better performance). Under this scenario, the devices could have positive and negative threshold ranges, so that they could be programmed to "compete" to be the best, but only if the positive/negative threshold ranges are violated. In this way, a mutually degrading group may each perform an action (such as restarting) if they detect that a device in the group is vastly out-performing them, but not if it is just slightly outperforming them.

In an embodiment, the consensus protocol for a group may allow two-way communication between neighboring networking devices in the group, such as half-duplex or full-duplex communications modes. Two-way communication may enable neighboring devices to autonomously detect a malfunction or a decrease in performance efficiency without considering the similarity metric for the whole group. For example, neighboring network devices querying a potential underperforming device may determine that their values of similarity metric are less than that of the potential underperforming device. The neighboring network devices may therefore determine that they are also underperforming.

In an embodiment, a network device may be removed from a network group based on the comparison between the values of the similarity metric of the network group. Further, the network device may be subsequently added to another network group based on current performance or any other metric. The similarity metric corresponding to the new network group may be then enforced on the network device and a value $\Delta$ of the similarity metric may be determined for further evaluation. Thus, underperforming devices could be added to tiered groups (or sub-groups), which could vary from underperforming but still performing to continuously re-starting to being entirely unresponsive.

As illustrated in FIGS. 1B and 1C, the network device $104_{22}$ is identified as a malfunctioning or inefficient device. In some embodiments, the network device $104_{22}$ may autonomously identify a degradation in its performance by dynamically monitoring the value $\Delta$ of the similarity metric, or a poll amongst a sub-set of group members may dictate that an action be taken. In some embodiments, the network device $104_{22}$ may compare the value $\Delta$ of the similarity metric with the values of the similarity metric corresponding to the other network devices of the network group 104 in order to detect any malfunctioning. In some other embodiments, neighboring network devices (e.g., $104_{21}$ and $104_{12}$) of the network group 104 may determine malfunction or a dissimilarity in the network device $104_{22}$. The other network devices $104_{11}$-$104_{pm}$ of the network group 104 may take an action based on a collaborative vote to mitigate the problem and maintain an overall performance of the network group 104. The action may include restarting the network device $104_{22}$, re-routing the network packets around the network device $104_{22}$, re-grouping the network device $104_{22}$ into a new group or sub-group, and so forth. In some other embodiments, the network devices $104_{11}$-$104_{pm}$ may remove the network device $104_{22}$ from the network group 104 based on the calculated value $\Delta$ of the device $104_{22}$ similarity metric.

In some embodiments, the network device $104_{22}$ may autonomously take action to maintain the overall performance efficiency of the network group 104. The network device $104_{22}$ may perform various steps after determining that it is out-of-norm. The network device $104_{22}$ may determine that a malfunction can be self-assessed and rectified. Accordingly, network device $104_{22}$ performs corrective action. For example, if a temperature of the network device $104_{22}$ is high, the network device $104_{22}$ may increase the fan speed to reduce the temperature. Alternatively, the network device $104_{22}$ may determine that the malfunction can be self-assessed but cannot be rectified independently. For example, the network device $104_{22}$ may determine that it is dropping an abnormal amount of traffic and restarting fails to rectify the problem. In such a case, the network device $104_{22}$ may notify the other network devices $104_1$-$104_{pm}$ of the network group 104 about the malfunction. The other network devices $104_1$-$104_{pm}$ may then decide an action based on the consensus protocol. In some embodiments, the network device $104_{22}$ may be unable to autonomously detect a malfunction or abnormality. However, the network device $104_{22}$ may be able to take corrective action. In such a case, at least one of the other network devices $104_{11}$-$104_{pm}$ communicates with the network device $104_{22}$ and proposes a corrective, or self-healing action. For example, the network device $104_{22}$ may be discarding packets or restarting frequently. The network device $104_{21}$ may propose the network device $104_{22}$ to restart or decrease an amount of accepted traffic. In other embodiments, the network device $104_{22}$ may be unable to autonomously detect a malfunction or take any corrective action. In such a case, other network devices $104_1$-$104_{pm}$ may determine that the network device $104_{22}$ is underperforming and not responding to notifications. The other network devices $104_1$-$104_{pm}$ may flag the network device $104_{22}$ and reroute traffic around the network device $104_{22}$. Further, the other devices $104_{11}$-$104_{pm}$ may escalate the issue to a central server.

As illustrated in FIG. 1C, the network traffic is rerouted away from the network device $104_{22}$. Specifically, the network traffic is routed around the network device $104_{22}$. In some embodiments, network traffic is routed around the network device $104_{22}$ until the value $\Delta$ of the similarity metric meets a threshold, or has a requisite ranking in the similarity table of the network group 104.

Figure 2:
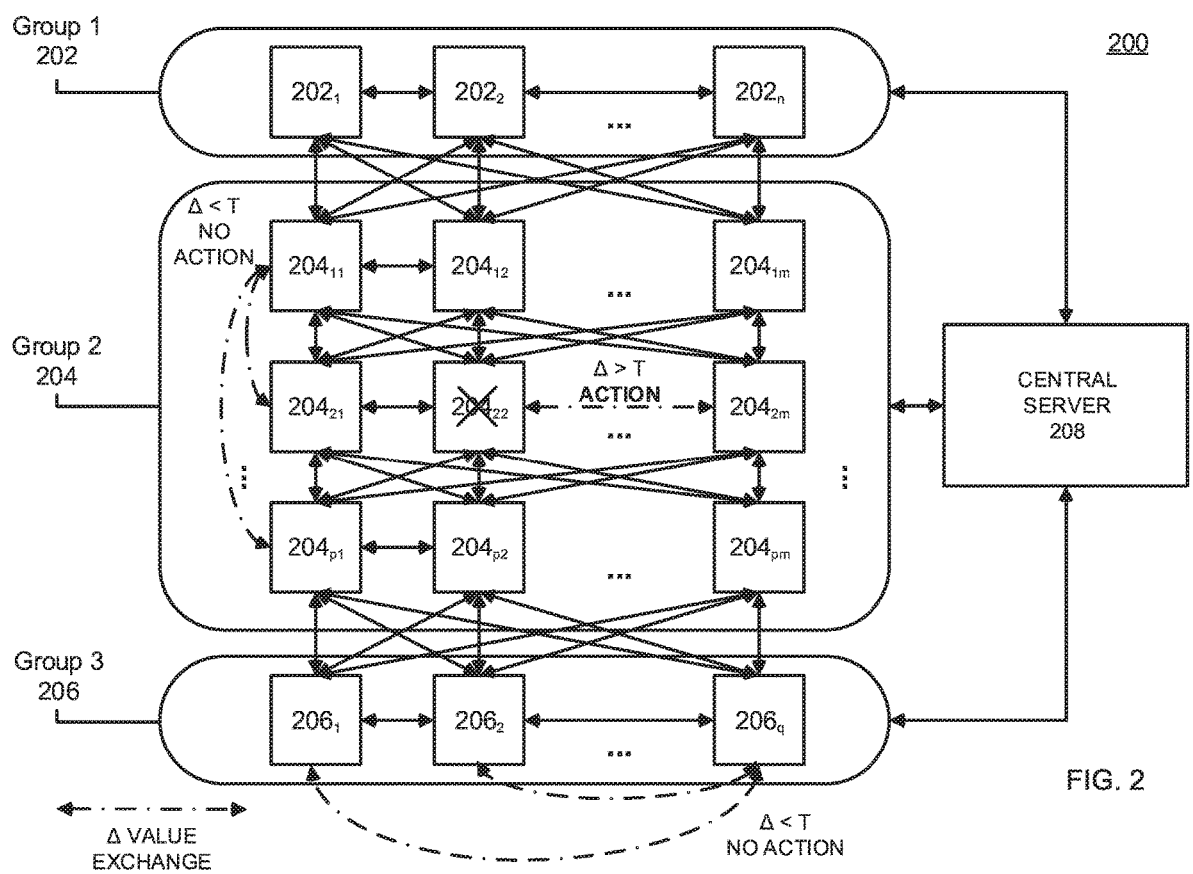
FIG. 2 illustrates a network system including a central server, in accordance with an embodiment.

FIG. 2 illustrates a network system 200 including a central server 208, in accordance with an embodiment of the present disclosure. The network system 200 includes a plurality of network devices $202_1$-$206_q$ communicably connected to the central server 208. The network devices $202_1$-$206_q$ may include, but not limited to, virtual machine instances (VMI's), digital sub-systems, server computers, modems, routers, switches, hubs, satellite link components, fiber modems, and so forth. The central server 208 may include any device including a memory and a processor such as, but not limited to, a digital sub-system, a server computer, and so forth. The network devices $202_1$-$206_q$ and the central server 208 may be communicably coupled via communication links.

In some embodiments, the central server 208 forms one or more groups of network devices from the plurality of network devices $202_1$-$206_q$. The network devices of each group are a subset of the plurality of network devices $202_1$-$206_q$. As illustrated in FIG. 2, the central server 208 forms a network group 202 including the network devices $202_1$-$202_n$, a network group 204 including the network devices $204_{11}$-$204_{pm}$, and a network group 206 including the network devices $206_1$-$206_q$. In an embodiment, the central server 208 forms the network groups 202, 204 and 206 of the respective network devices $202_1$-$202_n$, $204_{11}$-$204_{pm}$ and $206_1$-$206_q$ based on at least one attribute of the network devices $202_1$-$206_q$. In some embodiments, the attribute may define a similarity among the network devices of a group. In some other embodiments, the attribute can include one or more of a device type, a device function, a geographic location, or any other attribute as previously described with reference to FIGS. 1A-1C.

In an embodiment, the central server 208 may communicate with each of the network devices $202_1$-$206_q$ to select at least one similarity metric for each of the network groups 202, 204, and 206. In alternative embodiments, each of the network devices $202_1$-$206_q$ may communicate with other network devices in the respective network groups 202, 204, and 206, to select the at least one similarity metric. In some embodiments, the configuration can be "semi-autonomous," where the individual groups decide on a similarity metric collectively, and report the similarity metric to the central server 208 for recordation, approval, or both. Similarly, the central server 208 may suggest a similarity metric (rather than impose one) to one or more of the groups and seek approval following a collaborative vote from the devices in the group. In some scenarios, the central server 208 could be in direct communication with each device in the group. Alternatively, each group could have one or more "ambassadors" that are designated to communicate with the central server 208 to reduce network traffic. As with the fully autonomous embodiments discussed above, the similarity metric may be selected based on a consensus protocol. The consensus protocol can enable each of the network devices $202_1$-$206_q$ and/or the central server 208 to propose one or more similarity metrics to evaluate the performance of the network devices $202_1$-$206_q$ within the respective network groups. The proposed similarity metrics may be communicated to each of the network devices $202_1$-$206_q$ within the respective network groups. Further, the network devices $202_1$-$206_q$ within each group may autonomously reach a consensus to select the at least one similarity metric common to the corresponding group. In an embodiment, each of the groups 202, 204 and 206 may follow different consensus protocols. In another embodiment, the network devices $202_1$-$206_q$ of the network system 200 follow a common consensus protocol. In some embodiments, the consensus protocol may include selecting the similarity metric(s) with the maximum number of proposals within the group. In other embodiments, the consensus protocol may include selecting the similarity metric(s) that are proposed by a specific type of network device, for example, a computer server. In some other embodiments, the similarity metric is selected from at least one of a hardware metric and/or a performance metric. The hardware metric may include hardware parameters such as, but not limited to, fan speed, temperature, and so forth. The performance metric may be based on performance indices such as, but not limited to, packet dropped, time duration for packet transmission, bandwidth required, traffic in/out level and so forth.

In an exemplary embodiment, the central server 208 may request the network devices $202_1$-$206_q$ to determine a value of the corresponding similarity metric. Based on the request received from the central server 208, each of the network devices $202_1$-$206_q$ may determine various values of the similarity metric such as, but not limited to, temperature, efficiency, workload, connection status, and so forth. The values of the similarity metric may indicate a degree of similarity between two or more network devices. In some embodiments, the central server 208 may periodically request the network devices $202_1$-$206_q$ for the values of the similarity metric.

In an embodiment, the central server 208 may compare the values of the similarity metric, corresponding to the network devices $202_1$-$206_q$ in the respective groups, based on a predetermined criterion. The comparison between the values of the similarity metric may be indicative of a degree of similarity between the network devices in a group. In some embodiments, the predetermined criterion may include comparing the values of the similarity metric of the network devices in a group of with each other. Further, a similarity table may be computed based on the comparison between the values of the similarity metric. The value Δ of the similarity metric may correspond to a score of the network device in a similarity table. In some embodiments, the similarity table is defined as a hierarchical list of the network devices of a network group arranged according to the values of the corresponding similarity metric. The hierarchical list for a group may include the network devices in the group arranged in an ascending order or a descending order based on the values of the corresponding similarity metric. The hierarchical list may be dynamically updated based on the current values of the similarity metric. Further, the central server 208 may store the hierarchical list of each of the network groups. In alternative embodiment, a specific network device in a group may compute and update the hierarchical list, and transmit the hierarchical list to the central server 208. The central server 208 may transmit the corresponding hierarchical list to each of the network devices $201_1$-$206_q$. Further, the central server 208 may store the values of the similarity metric corresponding to each of the network devices $202_1$-$206_q$. The central server 208 may also maintain a historical record of the values of the similarity metric. Each of the network devices $202_1$-$206_q$ may also store a current hierarchical list for the each of the network groups.

In some embodiments, each of the network device $202_1$-$206_q$ may determine any degradation in its performance based on the comparison between the values of the similarity metric of the respective network groups. In an exemplary embodiment, at least one of the network devices of a network group determines an action at one or more network devices of the group based on the comparison between the values of the similarity metric. In an example, the comparison between the values of the similarity metric may indicate an out-of-norm network device within the network group. The other network devices of the group may take an action to mitigate the problem and maintain the performance efficiency of the network group. In some embodiments, the out-of-norm network device may autonomously identify any malfunction or degradation in its performance based on the comparison and take suitable action. For example, the network device may restart itself or reconfigure to maintain the performance efficiency and stability of the corresponding network group. In some other embodiments, the action to be taken at the one or more network device is based on the consensus protocol. The network devices of the group may propose an action to mitigate any performance degradation caused by the out-of-norm device based on the consensus protocol. In some embodiments, the network devices may collaboratively vote for the action to be taken on the out-of-norm device. The action can include, but not limited to, restarting the out-of-norm device, rerouting the traffic away from the out-of-norm device, reconfiguring the out-of-norm device, and so forth.

The actions taken by one or more of the devices in the group may be reported to the central server 208. In some instances, such as a critical failure requiring maintenance (say, device unresponsiveness due to a faulty fiber optic connection), the central server 208 may dispatch an email or otherwise initiate communication to an administrator or tech assistant that a maintenance task may need to be performed, and identify the device at issue. Further, since central server 208 is not performing a comparison of similarity metrics with the devices from groups 202, 204, 206, the central server can objectively determine if an entire group is undergoing network degradation (i.e., "downward spiraling"), and can instruct one or more devices to take corrective action, overriding the one or more individual devices decision based on the similarity metric. The central server 208 can also be responsible for the initial and subsequent device groupings and device assignment to a given group. Additionally, the central server 208 could be responsible for creating new groups (and sub-groups) to alleviate the processing load on the individual devices as compared to embodiments that perform these tasks autonomously. The central server 208 also allows for the possibility that an entire group (say group 204) be taken offline temporarily (such as for routine maintenance or upgrades) while also allowing the remaining groups (group 202, group 206) to maintain contact through the central server 208.

Figure 3:
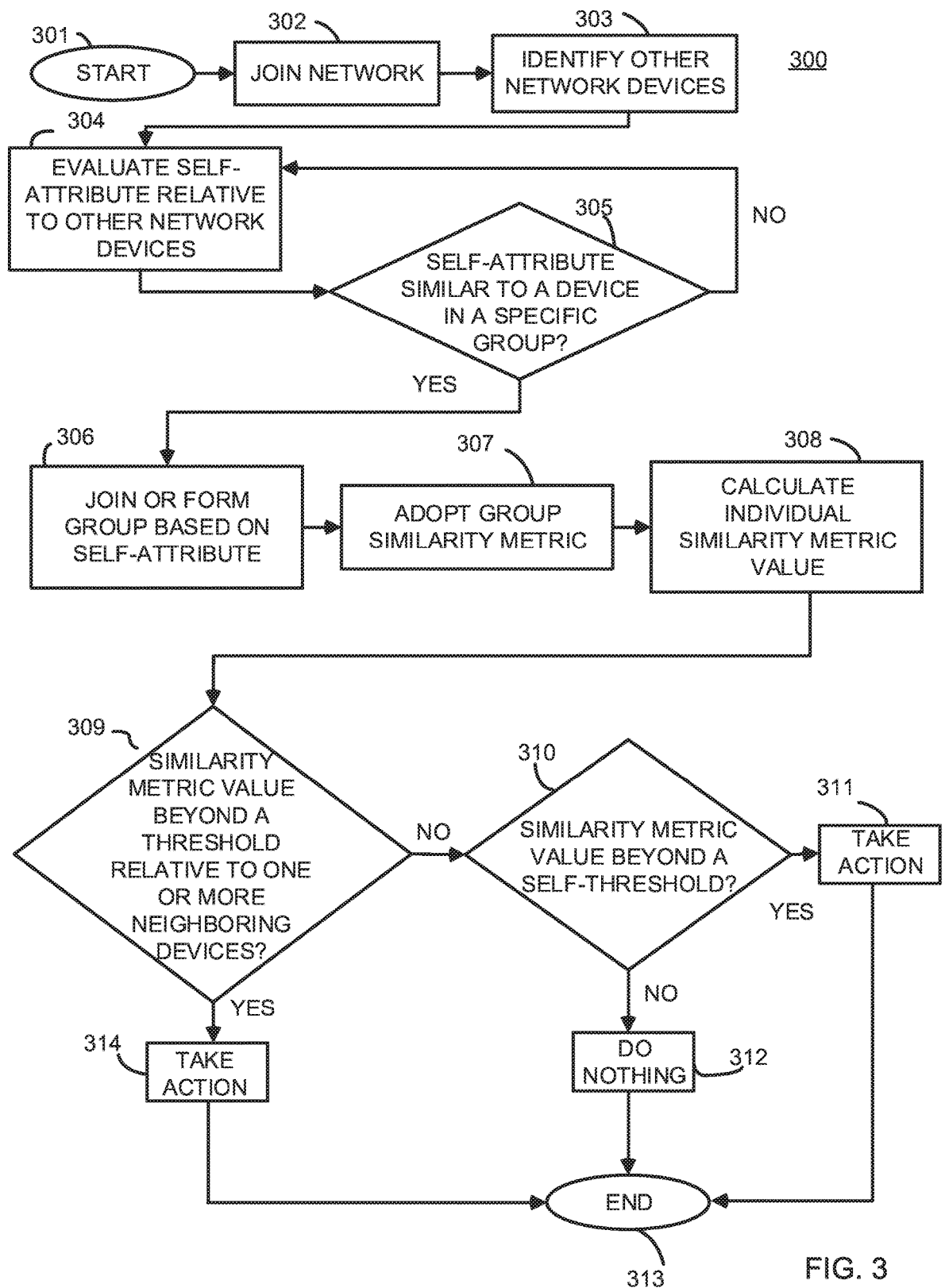
FIG. 3 is a flowchart illustrating a method for network device monitoring and network device correction in a network system, in accordance with an embodiment.

FIG. 3 illustrates a method 300 for autonomous network discovery, monitoring, and maintenance (including various corrective or "self-healing" measures employed by any member of the group, and in some instances, any members of the network). This flowchart is merely provided for exemplary purposes and may be implemented on the network systems 100 or 200, as illustrated in FIGS. 1A-1C and 2.

The method begins at process block 301. At process block 302, a network device joins an arbitrary network hosting a plurality of other network devices. At process block 303, the network device identifies one or more other network devices on the network. In identifying other devices, the network device could keep a "personal" list of IP addresses, device names or attributes, MAC addresses, or the like. The network device could also or in preference to record various other device attributes such as manufacturer, device type/functionality, geography, storage capacity, available bandwidth, etc. The network device could store this information locally or remotely, such as in one or more network devices within the same group, one or more network device in a different group or between different groups and the same group, scattered across in-group or out-of-group devices, on a central server.

At process block 304, the network device evaluates a self-attribute with an attribute of an identified other network device in a logical group. In some embodiments, other devices could identify the network device as having a same or similar self-attribute first and send the device an "invitation" to join the group. The self-attribute(s) could be any of the pre-listed attributes or more, and the attribute may only fall in a family of attributes (such as memory capacity) without singling out other attributes (such as device type, e.g. router, or manufacturer, etc.).

At process block 305, the network device compares its "personal," device-specific self-attribute with a same or similar attribute of another identified device on the network. If the network device determines that the attributes are sufficiently similar, the network device can make an autonomous decision to join the same logical group as the identified similar network device at process block 306. If the network device determines that it is not sufficiently similar to the identified other network device, it may repeat process block 305 one or more times until a suitable match is found. In some instances where no such match can be identified, possibly after a pre-determined period of time, a number of iterations, or based on attributes between the network device and the identified similar device that are close but not close enough, the device may choose to categorize itself into a new group at process block 306 which can subsequently be discovered and populated by other autonomous network devices joining the network. As previously stated, during dynamic similarity metric value comparison, devices can be un-grouped from their current group. These un-grouped devices are then free to discover other groups or create new groups or sub-groups.

As process block 306, as previously discussed, the network device joins a group having at least one partner with a most similar self-attribute, or creates a new group based on the network device's one or more self-attributes.

At process block 307 the network device adopts at least one group similarity metric. The similarity metric may be based on any measurable quantity relating to the functionality of the one or more network devices in the group, such as processor speed, available bandwidth, packet loss, temperature, available memory or anything else.

At process block 308 each individual device in the group calculates a "personal" similarity metric value Δ according to the similarity metric of the given group. In some embodiments, the similarity metric can be calculated by the individual device that the similarity metric value Δ describes. In other embodiments, group members monitoring the device may calculate the similarity metric value Δ. In still other embodiments, a group may have two or more similarity metrics used for comparison between the various network devices in the group. For example, group members might exchange similarity metric values pertaining to both bandwidth and packet loss in an attempt to more precisely characterize an underperforming or over-performing network device in the group.

At process block 309, similarity metric values of at least two network devices in the group are communicated between each other and a compared (calculated) value is compared against a threshold value. If the comparison results in a quantity that exceeds the threshold value, one or both of the network devices can take an action at process block 314. Additionally, two or more devices in the group which may include the network device can take a "vote", or poll to determine if an action should be taken at the network device. Such a "vote", or poll can allow for greater statistical analysis of average group performance with respect to the similarity metric.

At process block 310, if it is determined that a similarity metric value of a given metric device does not exceed a threshold relative to one or more of the neighbors of the network device, the network device may evaluate its similarity value against a predetermined or pre-stored threshold. This predetermined or pre-stored threshold may indicate a floor or ceiling value that cannot be crossed without an action being taken, such as at process block 311. The predetermined or pre-stored threshold could be useful in averting a group "downward spiral." For example, if a group is under attack, each group member may begin dropping packets at a similar rate, causing the similarity values between group members to uniformly increase or decrease, with the result that no group member recognizes a problem. By referring to a self-threshold, one or more group members may decide to take an action such as performing a restart. This group member may then come online at a later time and calculate a new similarity metric value which is substantially larger or smaller than the calculated similarity matric values for other members of the group. In some instances, a "polarity" may be associated with each network device in the group, such that other group members can recognize not just a difference in similarity, but that the difference is positive (a device is vastly over-performing) or negative (underperforming) relative to the other devices. In this situation, devices considered to be vastly out-of-the-norm may be restarted, regrouped, or removed from the data stream. The process ends at process block 313.

Figure 4:
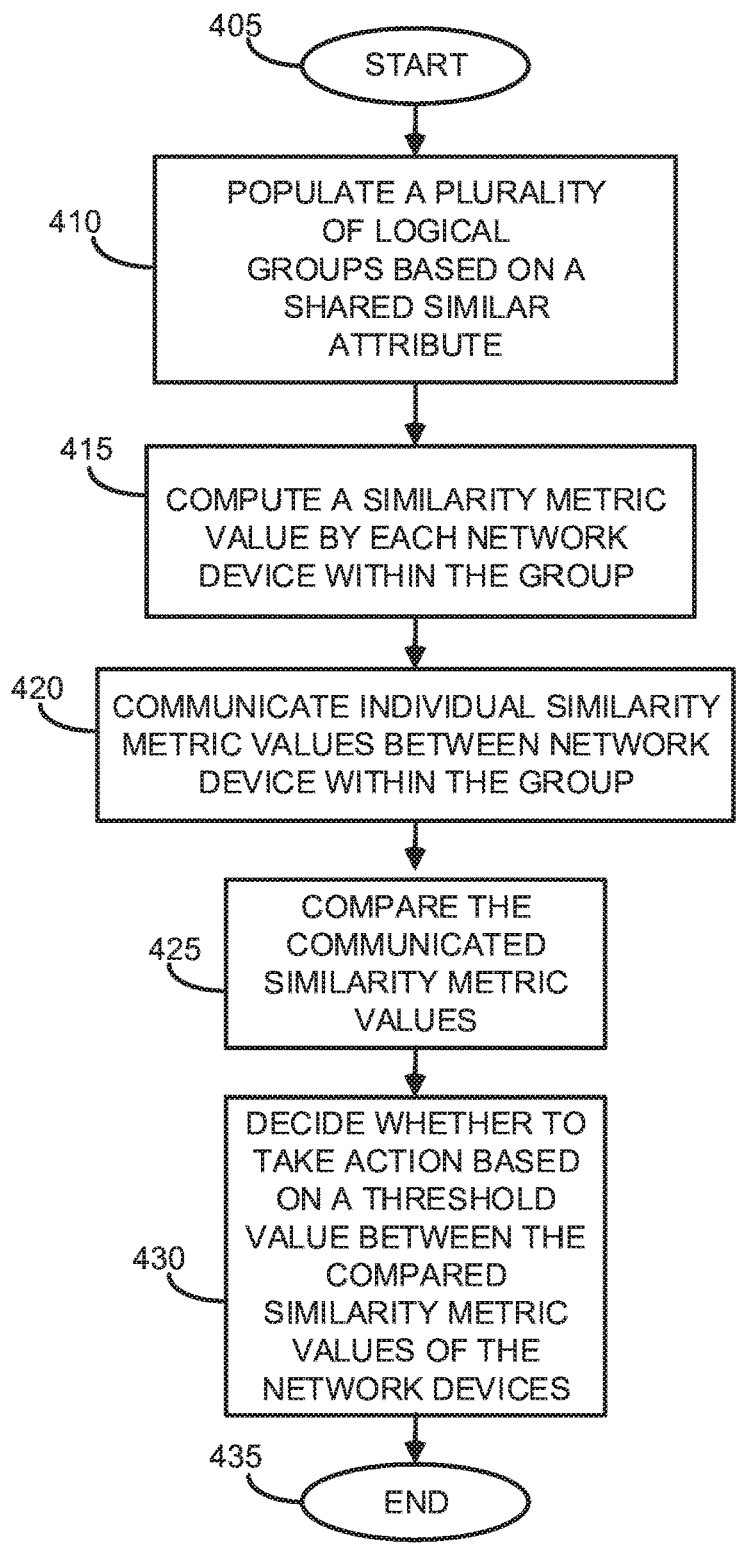
FIG. 4 is a flowchart illustrating a different embodiment for performing network device monitoring and network device correction in a network system.

FIG. 4 illustrates a method 400 according to an embodiment of the disclosure. The method 400 begins at process block 405 and proceeds to process block 410 where a plurality of logical groups on a network are populated based on a shared similar attribute between two or more network devices. For example, devices may independently identify with a hardware type (such as a server), an operating system or firmware type, etc. In some embodiments, aspects of the configuration of the network devices such IP or DNS settings may be considered, and so forth.

In process block 410, each network device makes a decision as to which group it will populate based on the device's individual attribute and an attribute of a device in one of the plurality of logical groups. For example, a device may decide that it most generally represents a WiFi modem, and thus seeks to join a group common to this attribute.

At process block 415 each network device within a logical group computes an individual similarity metric value based on at least one similarity metric assigned to the respective logical group. In the case of a router or switch, this could be generalized to features such as packet processing efficiency, traceroute loss, quality of service (QoS) metrics, etc.

At process block 420 two or more devices within a logical group communicate their individual similarity metric values with each other to enable a comparison between the various network devices in the group.

At process block 425 either or both network devices compare the communicated individual similarity metric values to determine a number, and compare that number to a similarity metric threshold. For example, a device may conclude that its latency exceeds a comparative group member with a same attribute. As previously discussed the similarity metric values may also be communicated to any or all other logical group members and/or to any other network entity for comparison, polling, etc.

At process block 430 a decision is made as to whether to take an action on a particular network device based on the compared similarity metric values relative to the threshold value. This decision may be made by any subset of network devices in the logical group such as by the individual network device (without further input), by a single neighboring network device monitoring the network device, or by two or more network devices in the logical group by means of a consensus poll. Additionally, determinations may be made or polled from network devices that do not belong to the logical group according to common similarity metric rules between the groups. The method 400 ends at process block 435.

Figure 5:
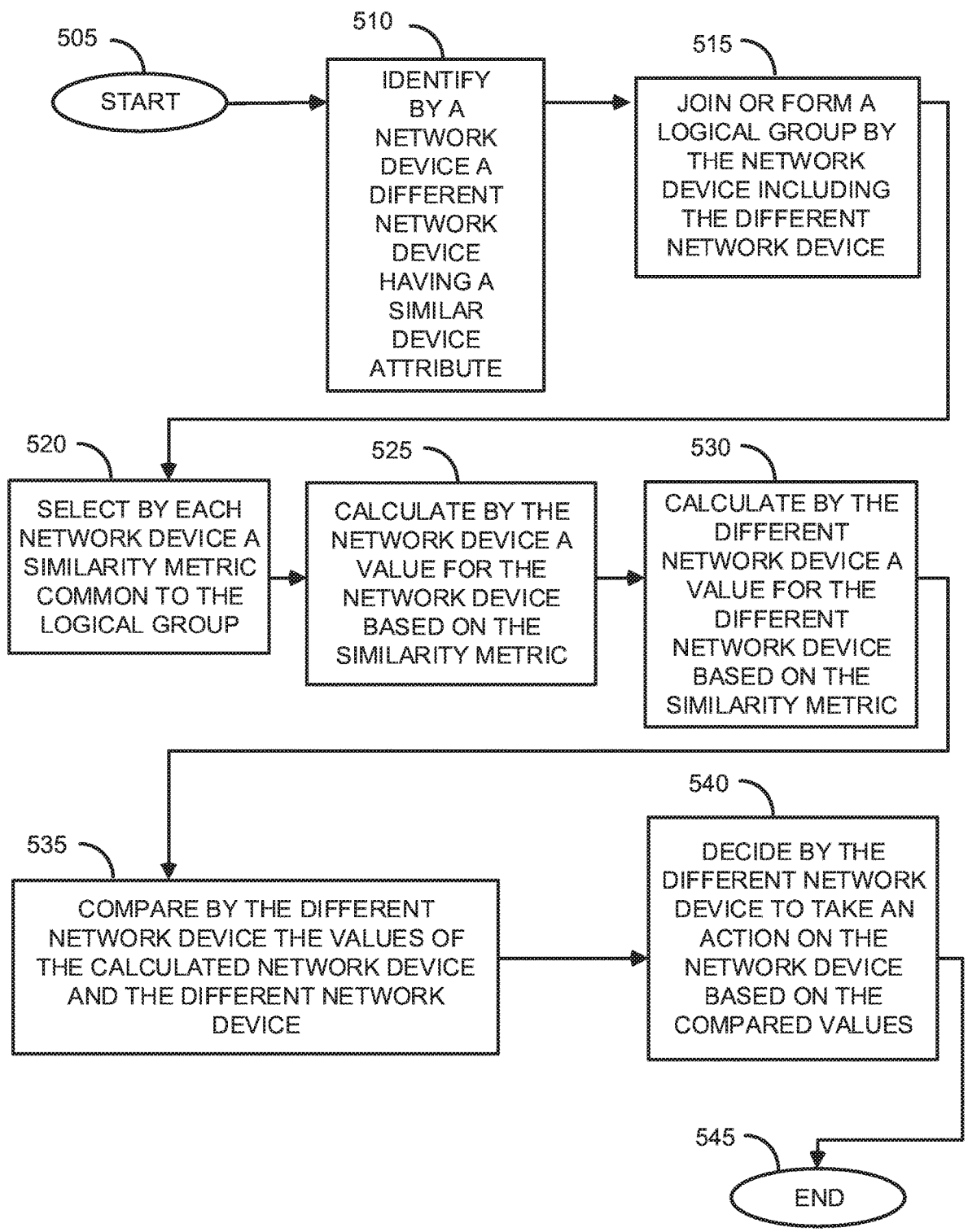
FIG. 5 is a flowchart illustrating another embodiment of performing network device monitoring and network device correction in a network system.

FIG. 5 illustrates a method 500 in accordance with various embodiments of the disclosure. In FIG. 5 the method 500 begins with process block 505, and proceeds to process block 510, where a network device communicating over a network identifies a different network device on the network having a same or similar device attribute as the network device. This attribute may be a hardware attribute (such as an OS version) or a functional attribute relating to aspects of the similar device (such as the number of connections the device shares in common with the similar device).

At process block 515 the network device joins or forms a logical group that includes the different network device having the same or similar attribute. In process block 515, if the logical group comprises more than the two network devices each network device within the group may be notified of the addition of either or both network devices.

In process block 520 each of the network devices in the logical group select at least one similarity metric common to each network device in the logical group. As previously stated, the similarity metric may comprise any measure of varying performance between differing members of the group.

In process blocks 525 and 530, each network device in the logical group calculates at least one individual similarity metric value for itself based on the similarity metric of the logical group. As described above, individual similarity values may indicate various quantities such as packet loss, bandwidth availability, temperature, or any other quantity pertinent to the performance of each individual network device within a logical group. In some embodiments, the individual similarity metric value may be calculated by neighboring network devices within the logical group, or could even be calculated by one or more network devices in differing logical groups sharing related similarity metrics.

In process block 535 the different network device compares its similarity metric value to the similarity metric value of the network device. The comparison make comprise any form of mathematical or statistical correlation between the network devices, and may further include various algorithmic or other means of comparison.

In process block 540, the different network device makes a decision as to whether or not an action should be performed, recommended, or voted upon by other network device members of the group, which may include decisions by or including the network device. The method 500 terminates at process block 545.

Figure 6:
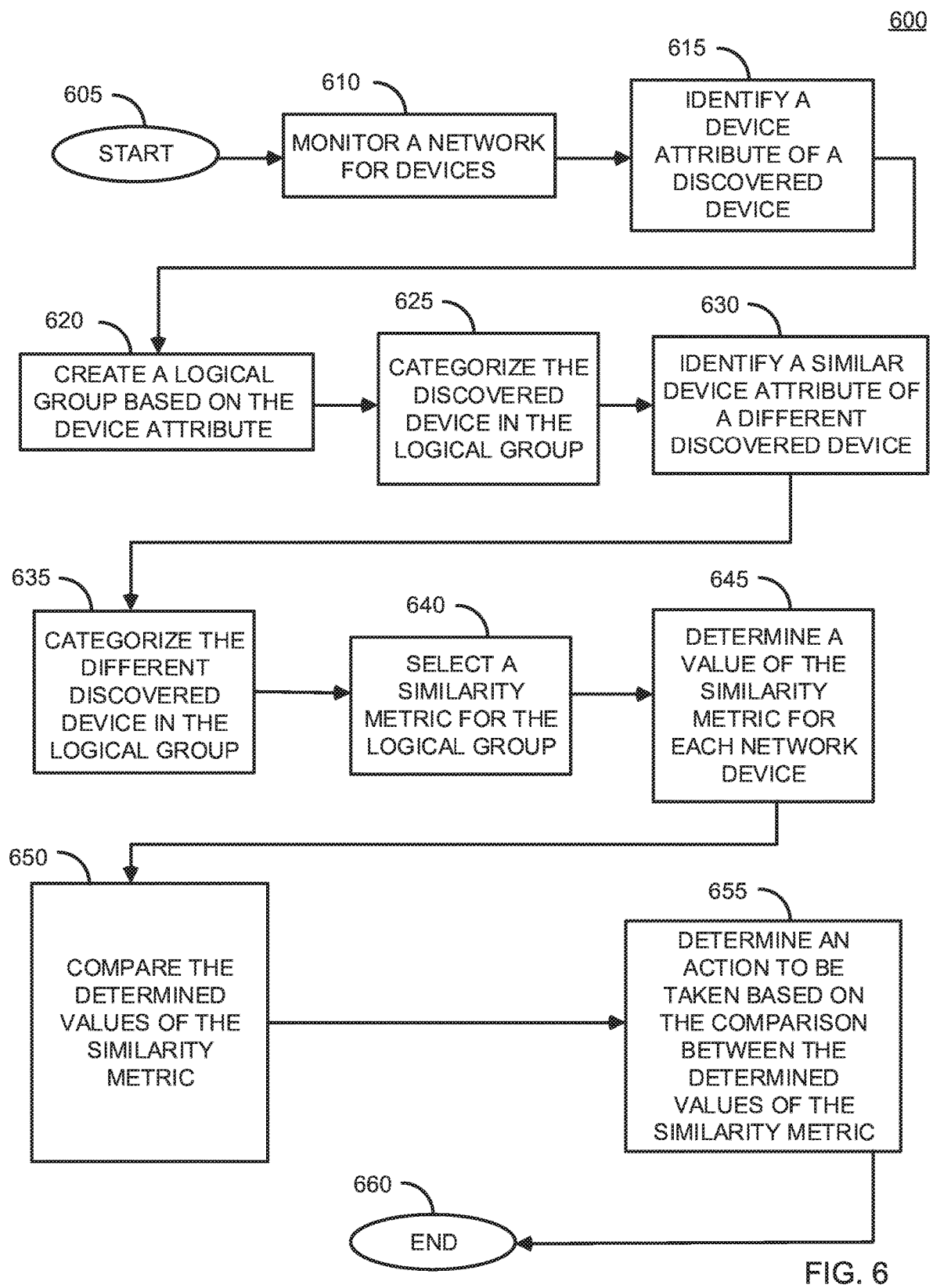
FIG. 6 is a flowchart illustrating another embodiment of performing network device monitoring and network device correction in a network system.

FIG. 6 depicts a method 600 in accordance with various embodiments of the disclosure. In FIG. 6 a monitoring network entity, such as a central server computer (as depicted in FIG. 2) or other network device evaluates and/or controls the behavior of a plurality of other network devices. The method 600 begins at process block 605 and proceeds to process block 610, where a network is monitored for new or existing network devices. These devices may include any form of electronic device, such as routers, switches, client computing devices, or any other identifiable network device.

At process block 615, the monitoring network entity identifies a network device having a particular device attribute. This attribute may be any one of a performance attribute, identification attribute, or any other attribute that may be used to categorize the network device.

At process block 625, the monitoring network entity categorizes the discovered network device into a logical group. In some instances, the monitoring entity may bias the categorization towards an overall system metric (such as speed, memory, etc.). In other instances, the monitoring entity may rely on device similarity, device geography (in the same building, same rack, etc.) or based on anything else.

At process block 630 the monitoring network entity identifies a similar network device attribute of a different network device. The monitoring network entity can then decide if the different network device attribute is reasonably similar to the network device.

At process block 635, the monitoring network entity categorizes the different discovered network device in the same logical group as the originally identified network device if the shared attribute is similar enough.

At process block 640 the monitoring network entity selects one or more similarity metrics to apply to the group.

The similarity metrics may include such feature as device speed, available memory, packet flow, traceroute loss, or anything else.

At process block 645 an individual network device value for the at least one similarity metric is calculated or otherwise determined. In some instances, the individual similarity metric values are calculated or otherwise determined by the network device itself, by fellow network device members of the logical group, or by the monitoring network entity. In some embodiments any permutation of these network device entities including network devices in differing logical groups may be employed to determine individual similarity metric values.

In process block 650, at least two of the similarity metric values of network devices in a logical group are compared. As described in process block 645 above, the comparison may be performed by the networking device, by fellow network device members of the logical group, by the monitoring network entity, or any permutation of these network device entities including network devices in differing logical groups.

In process block 655, a determination is made as to whether or not to perform an action on the network device by any of the networking device, a poll between fellow members of the network device logical group, or by the monitoring network entity. In some embodiments any permutation of these network device entities including network devices in differing logical groups may participate in the determination. The method 600 terminates at process block 660.

Figure 7:
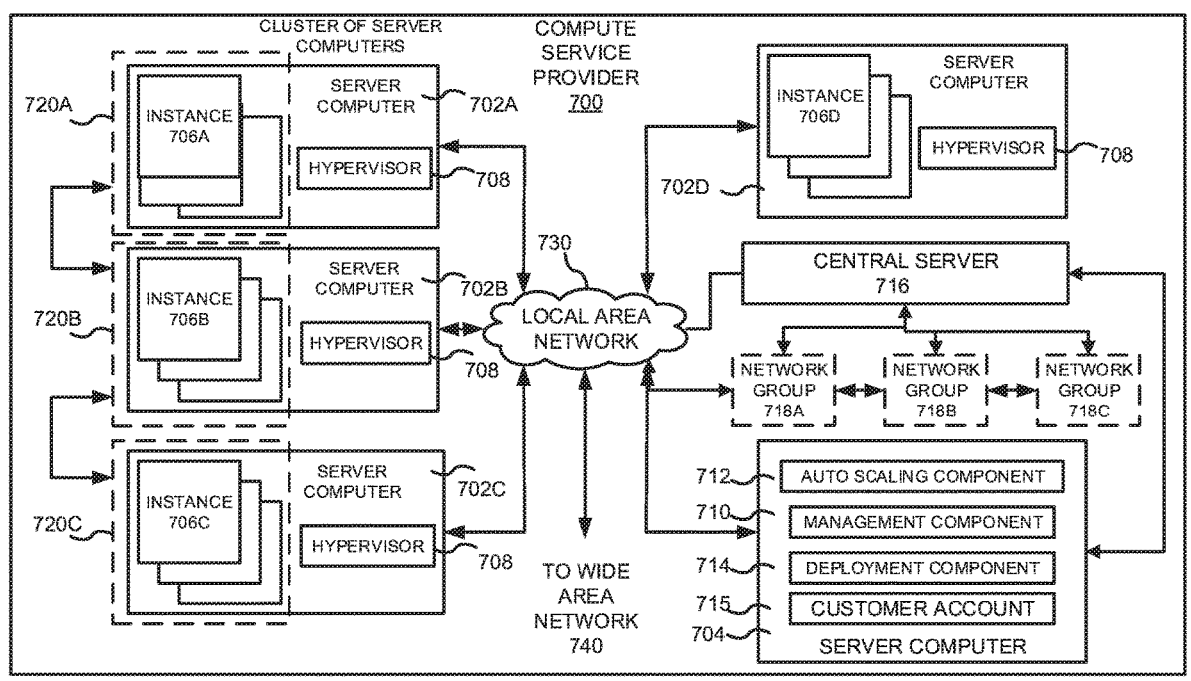
FIG. 7 illustrates an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider 700 can be established for an organization by or on behalf of the organization. That is, the compute service provider 700 may offer a "private cloud environment." In another embodiment, the compute service provider 700 supports a multi-tenant environment, wherein a plurality of customers operates independently (i.e., a public cloud environment). The compute service provider 700 may provide the network models such as, but not limited to, Infrastructure as a Service ("IaaS"), Platform as a Service ("PaaS"), and/or Software as a Service ("SaaS") and so forth. For the IaaS model, the compute service provider 700 may offer computers as physical or virtual machines and other resources. The virtual machines may be executed as guests by a hypervisor, as described further below. The PaaS model delivers a computing platform that can include an operating system, programming language execution environment, database, and web server. Application developers can develop and run their software solutions on the compute service provider platform 700 without the cost of buying and managing the underlying hardware and software. The SaaS model allows installation and operation of application software in the compute service provider 700. In some embodiments, end users may access the compute service provider 700 using networked client devices, such as desktop computers, laptops, tablets, smartphones, running web browsers, client applications and so forth. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D may provide computing resources for executing software instances 706A-706D. In one embodiment, instances 706A-706D are virtual machines. Further, a virtual machine is an instance of a software implementation of a machine (i.e. a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. An auto-scaling component 712 can scale the instances 706 based upon rules defined by the customer. In one embodiment, the auto-scaling component 712 allows a customer to specify scale-up rules for use in determining when new instances should be instantiated and scale-down rules for use in determining when existing instances should be terminated. The auto-scaling component 712 can consist of a number of sub-components executing on different server computers 702 or other computing devices. The auto-scaling component 712 can monitor available computing resources over an internal management network and modify resources available based on need.

A deployment component 714 may be used to assist customers in the deployment of new instances 706 of computing resources. In some other embodiments, the deployment component 714 may assist a client in the deployment of a new network device within an existing network group. The deployment component 714 may have access to account information associated with the instances, such as who is the owner of the account, credit card information, country of the owner, etc. The deployment component 714 may receive a configuration from a customer that includes data describing how new instances 706 should be configured. In some other embodiments, the deployment component 714 may receive information from a client including instruction for the configuration of the newly added device. For example, the configuration can specify one or more applications to be installed in new instances 706, provide scripts and/or other types of code to be executed for configuring new instances 706, provide cache logic specifying how an application cache should be prepared, and other types of information. In alternative embodiments, the configuration may specify the similarity metric to be implemented on the newly added network device. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component 714.

Customer account information 715 can include any desired information associated with a customer of the multi-tenant environment. For example, the customer account information 715 may include a unique identifier for a customer, a customer address, billing information, licensing information, customization parameters for launching instances, scheduling information, auto-scaling parameters, previous IP addresses used to access the account, etc. In this way, through the customer account, a customer or administrator can setup the account into an authorization check only mode, wherein each received Application Programming Interface (API) does not get performed, but is checked to determine permissions and a result returned accordingly.

A network 730 can be utilized to interconnect the server computers 702A-702D and the server computer 704, 750. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In the compute service environment 700 illustrated in FIG. 7, both autonomous and semi-autonomous embodiments of device grouping and communication are depicted. In FIG. 7, groups 720A, 720B, and 720C represent a sub-network of autonomously grouped devices 706A-C, each instance of which resides in exactly one of the groups. The network groups 720A-720C may be similar to the network groups 102, 104, 106, as shown in FIGS. 1A-1C. In some embodiments, each of the network groups 720A-720C may include multiple network devices such as instances 706A-706C. The network devices of the network groups 720A-720C may be interconnected with each other via the network 730 or may simply communicate with each other directly. As depicted in FIG. 7, group 720A can be in direct communication with group 720B, which in turn can be in direct communication with group 720C. In some embodiments (not shown), groups 720A-720C can also be in direct communication with in any or all group permutations (such as group 720A being in communication with both groups 720B and 720C). Although all three groups are depicted as also being connected through the local area network 730, this needn't necessarily be the case, as only one (or even none) need be connected to the local area network. As previously stated, each group may autonomously form based on device discovery and communicate with one another as depicted by the communication arrows on the far left of FIG. 7. This configuration both mirrors and abstracts the configuration depicted in FIGS. 1A-1C. The devices in the network groups 720A-720C may autonomously identify out-of-norm devices in the respective groups and perform corrective actions based on corresponding consensus protocols.

Additionally, in a semi-autonomous embodiment, central server 716 communicates with network groups 718A-718C, which also may or may not be connected with the network 730. The central server 716 may be similar to the central server 208 described above with reference to FIG. 2. The network groups 718A-718C may be similar to the network groups 202, 204, 206, as shown in FIG. 2. In some embodiments, each of the network groups 718A-718C may also include multiple network devices (not shown). The network devices of the network groups 718A-718C may be interconnected with each other via the network 730 or may simply communicate with each other directly and/or through the central server 716. In an embodiment, the central server 716 may form a network group from a plurality of network devices based on at least one attribute of the network devices. The attributes may be retrieved from the management component 710, or may be programmed into the central server 716. In some other embodiments, the central server 716 may group the network devices with the implementation of the deployment component 714. The central server 716 may also select a similarity metric for each of the network groups 718A-718C. The devices in the network groups 718A-718C may semi-autonomously identify out-of-norm devices in the respective groups and perform corrective actions based on corresponding consensus protocols.

In some embodiments, the autonomous and semi-autonomous configurations may be in communication with each other directly, through the network 730, or through the central server 716. For example, the central server 716 may also be in communication with one or more of the server computers 702A-702D and 704. In some embodiments, the central server 716 may arrange the server computers 702A-702D into one or more network groups based on at least one device attribute. Similarly, instances 706A-C may arrange themselves into one or more groups based on at least one device attribute. In an embodiment, the attribute may be a type and a configuration of each of the server computers 702A-702D. The central server 716 may select a similarity metric for each group of the server computers 702A-702D. Likewise, similarity metrics may be calculated, detected, programmed or otherwise formulated for each of the groups 720A-C. In some embodiments, one or more of the groups 720A-C may further identify out-of-norm network devices in a group by comparing values of the similarity metric of the network devices based on predetermined criteria; this function could also be performed by central server 716. The Groups 720A-C and/or central server 716 may further transmit information regarding out-of-norm devices of each network group to the auto scaling component 712. The auto scaling component 712 may add or remove network devices based on the information received from groups 720A-C and/or central server 716. In either case, autonomous or semi-autonomous self-healing groups can be formed that can monitor various parameters and perform corrective actions without any external intervention.

In some embodiments, network devices may be connected in a parallel configuration, such as illustrated in FIG. 8. FIG. 8 depicts three groups 802, 804, and 806 comprising devices $802_1$-$802_n$, $804_{11}$-$804_{pm}$, and $806_1$-$806_q$ connected in parallel. Each of the features previously described in FIGS. 1A-7 for a series configuration of groups may still be valid for a parallel group geometry, with the exception that a parallel geometry allows group 2 804 and group 3 806 to communicate directly with devices resident in group 1 802 without hopping through an intermediary group. In some embodiments, the network groups may "stack" in both series and parallel configurations indefinitely creating complex autonomous or semi-autonomous formations. In the most basic parallel configuration depicted in FIG. 8, each of the inter-group devices (say, devices $802_1$ and $802_n$) may still exchange the similarity metric values A, but are logically closer to each of the other group devices in the network, and thus may be able to more quickly or efficiently exchange similarity metric values with other groups if required. Additionally, parallel geometry groups may be edge-connected as illustrated by the dotted line of FIG. 8 to create a circular network topology. The circular topology has an advantage that groups or devices in the network topology can register in a hierarchical "rank" of ascending (or descending) priority. This feature results from the added degree of freedom of network groups to branch indefinitely, thus forming a network taxonomy that may encompass the description, identification, nomenclature, and classification of various network groups and devices.

Figure 9:
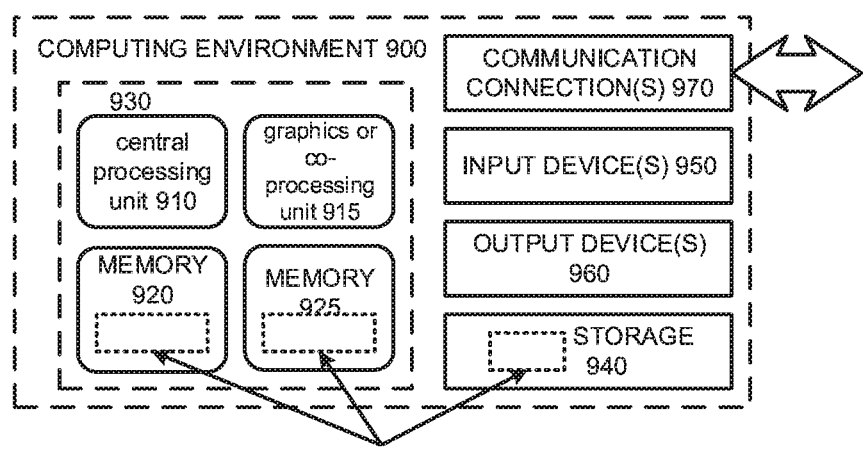
FIG. 9 depicts a generalized example of a suitable computing environment in which the described innovations may be implemented.

With reference to FIG. 9, the computing environment 900 includes one or more processing units 910 and 915. The computing environment 900 further includes memory units 920 and 925. In FIG. 9, this basic configuration 930 is included within a dashed line. The processing units 910 and 915 execute computer-executable instructions. A processing unit can be a general-purpose Central Processing Unit (CPU), processor in an Application-Specific Integrated Circuit (ASIC) or any other type of processor. In a multi-processing system, multiple processing units execute computer-executable instructions to increase processing power. For example, the processing unit 910 may be a central processing unit while the processing unit 915 may be a graphics processing unit or co-processing unit. The tangible memory units 920 and 925 may be volatile memory (e.g., registers, cache, RAM), non-volatile memory (e.g., ROM, EEPROM, flash memory, etc.), or some combination of the two, accessible by the processing units 910 and 915. The memory units 920 and 925 stores software 980 implementing one or more innovations described herein, in the form of computer-executable instructions suitable for execution by the processing units 910 and 915.

The computing environment 900 may have additional features. For example, the computing environment 900 includes a storage unit 940 (or storage 940), one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, a printer, a speaker, a CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed on, but not limited to, a single local computer (e.g., any suitable commercially available computer), a network environment (e.g., via the Internet, a wide-area network, a local-area network), a client-server network (such as a cloud computing network), and the like, using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in any suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. One or more non-transitory computer-readable media storing instructions, which when executed by processors on first and second network devices, cause the first and second network devices to perform operations comprising:
    choosing, by the first network device and the second network device, the first and second network devices belonging to a logical group, a similarity metric common to the logical group, from among a plurality of choices and based on a consensus protocol;
    calculating, by the first network device and the second network device, respective first and second values of the similarity metric; and
    by the second network device:
    comparing the first and second values; and
    based on the comparing:
        in at least a first case, causing an action on to be taken affecting a state of the first network device; and
        in at least a second case, determining a degradation of a performance parameter of the first network device and, based on the degradation of the performance parameter, changing a sub-group, of the logical group, to which the first network device belongs;
        wherein the changing the sub-group is further based on a value of the performance parameter being above or below a threshold value for the logical group.

2. The one or more non-transitory computer-readable media of claim 1, wherein the similarity metric is a hardware metric or a performance metric.

3. The one or more non-transitory computer-readable media of claim 1, wherein two or more logical groups may be formed or joined by a third network device having a different network device attribute than the first network device and the second network device.

4. The one or more non-transitory computer-readable media of claim 3, wherein a plurality of network devices form or join a set of three or more logical groups, wherein each logical group of the set is not directly communicatively coupled to each of the other logical groups of the set, and wherein each of the logical groups of the set is directly communicatively coupled to at least one further logical group, in series or in parallel, the further logical group being absent from the set.

5. The one or more non-transitory computer-readable media of claim 1, wherein the action to be taken comprises restarting the first network device, re-routing traffic around the first network device, decreasing an amount of traffic accepted by the first device, or shutting down the first network device.

6. A method implemented by processors on first and second network devices, the method comprising:
    proposing, by network devices of a logical group including the first and second network devices, a plurality of candidate metrics, and communicating the proposed candidate metrics among the logical group;
    selecting, by the first network device and the second network device, the first and second network devices belonging to the logical group, a similarity metric common to the logical group, from among the proposed candidate metrics, wherein the selected similarity metric has a maximum number of proposals among the proposed candidate metrics;
    calculating, by the first network device and the second network device, respective first and second values of the similarity metric; and
    on the second network device:
    comparing the first and second values; and
    based on the comparing:
        in at least a first case, causing an action to be taken affecting a state of the first network device; and
        in at least a second case, determining a degradation of a performance parameter of the first network device and changing a sub-group, of the logical group, to which the first network device belongs;
        wherein the changing the sub-group is based on the degradation of the performance parameter and on a value of the performance parameter being above or below a threshold value for the logical group.

7. The method of claim 6, wherein the similarity metric is a hardware metric.

8. The method of claim 6, wherein the similarity metric is a performance metric.

9. The method of claim 6, wherein the action to be taken is selected based on a poll between two or more network devices in the logical group.

10. The method of claim 6, wherein the action to be taken comprises restarting the first network device or shutting down the first network device.

11. The method of claim 6, wherein the action to be taken comprises re-routing traffic around the first network device.

12. The method of claim 6, wherein the action to be taken comprises decreasing an amount of traffic accepted by the first device.

13. A system, comprising:
    a plurality of network devices, each comprising a hardware processor with memory coupled thereto and coupled to a network; and
    computer-readable media storing instructions which, when executed on the network devices, cause first and second network devices of the network devices to perform operations comprising:
    selecting, by the first network device and the second network device, the first and second network devices belonging to a logical group, a similarity metric common to the logical group, from among a plurality of choices and based on a consensus protocol;
    calculating, by the first network device and the second network device, respective first and second values of the similarity metric; and on the second network device:
comparing the first and second values; and
based on the comparing:
- in at least a first case, causing an action to be taken affecting a state of the first network device; and
- in at least a second case, determining a degradation of a performance parameter of the first network device and changing a sub-group, of the logical group, to which the first network device belongs;
- wherein the changing the sub-group is based on the degradation of the performance parameter and on a value of the performance parameter being above or below a threshold value for the logical group.

14. The system of claim 13, wherein the operations further comprise:
calculating, by the first network device and the second network device, respective third and fourth values of the similarity metric; and
on the first network device:
comparing the third and fourth values;
determining a degradation of a parameter of the first network device; and
based on the degradation, changing a sub-group, of the logical group, to which the first network device belongs.

15. The system of claim 13, wherein the similarity metric is a hardware metric and the action to be taken comprises restarting the first network device or shutting down the first network device.

16. The system of claim 13, wherein the similarity metric is a performance metric and the action to be taken comprises restarting the first network device or shutting down the first network device.

17. The system of claim 13, wherein the choices are proposed by members of the logical group.

* * * * *

UNITED STATES PATENT AND TRADEMARK OFFICE
CERTIFICATE OF CORRECTION

| | |
|---|---|
| PATENT NO. | : 11,178,014 B1 |
| APPLICATION NO. | : 15/719467 |
| DATED | : November 16, 2021 |
| INVENTOR(S) | : Ondrej Sevce et al. |

It is certified that error appears in the above-identified patent and that said Letters Patent is hereby corrected as shown below:

In the Claims

Column 29, Line 38, Claim 1, "action on to be taken" should read --action to be taken--.

Signed and Sealed this
Thirtieth Day of January, 2024

Katherine Kelly Vidal
*Director of the United States Patent and Trademark Office*